(12) United States Patent
Ito et al.

(10) Patent No.: US 11,656,571 B2
(45) Date of Patent: May 23, 2023

(54) METAL FRAME OF IMAGE FORMING APPARATUS AND IMAGE FORMING APPARATUS

(71) Applicant: CANON KABUSHIKI KAISHA, Tokyo (JP)

(72) Inventors: Naruhiko Ito, Chiba (JP); Ryota Yasui, Tokyo (JP); Takahiro Kobayashi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/398,743

(22) Filed: Aug. 10, 2021

(65) Prior Publication Data
US 2022/0086293 A1    Mar. 17, 2022

(30) Foreign Application Priority Data

Sep. 15, 2020   (JP) .............................. JP2020-154963

(51) Int. Cl.
*G03G 21/16*   (2006.01)
(52) U.S. Cl.
CPC .............................. *G03G 21/1619* (2013.01)
(58) Field of Classification Search
CPC ................................................ G03G 21/1619
See application file for complete search history.

(56) References Cited

U.S. PATENT DOCUMENTS

| | | | |
|---|---|---|---|
| 9,442,458 B2 | 9/2016 | Kobayashi et al. | G03G 21/1647 |
| 10,274,893 B2 | 4/2019 | Yasui et al. | G03G 21/1619 |
| 10,691,061 B2 | 6/2020 | Yasui | G03G 21/1647 |
| 10,775,733 B2 | 9/2020 | Kobayashi et al. | G03G 15/0865 |
| 10,990,059 B2 | 4/2021 | Kawasumi et al. | G03G 21/1619 |
| 11,099,517 B2 | 8/2021 | Nakamura et al. | G03G 21/1619 |
| 2008/0003015 A1* | 1/2008 | Tomatsu | G03G 21/1619 399/110 |
| 2010/0014887 A1* | 1/2010 | Tomatsu | G03G 21/1619 399/107 |
| 2012/0099132 A1* | 4/2012 | Kurokawa | G03G 21/1619 358/1.13 |
| 2020/0094302 A1 | 3/2020 | Yahagi et al. | B21D 5/01 |

(Continued)

FOREIGN PATENT DOCUMENTS

JP   2008-116619   5/2008

OTHER PUBLICATIONS

U.S. Appl. No. 17/398,568, filed Aug. 10, 2021.
U.S. Appl. No. 17/398,809, filed Aug. 10, 2021.

*Primary Examiner* — Sandra Brase
(74) *Attorney, Agent, or Firm* — Venable LLP

(57) ABSTRACT

A metal frame of an image forming apparatus includes
a first support which includes a first metal plate and a second metal plate;
a second support configured to support the image forming unit together with the first support; and
a third support configured to connect the first support and the second support,
wherein the first metal plate includes a corner portion provided between a first portion and a second portion,
wherein the second metal plate includes
a third portion,
a fourth portion, and
a fifth portion,
wherein the fifth portion includes another corner portion located between a first stretched portion and a second stretched portion facing the corner portion of the first metal plate, and
wherein a tip of the second stretched portion faces the fourth portion.

14 Claims, 33 Drawing Sheets

(56) References Cited

U.S. PATENT DOCUMENTS

2021/0063943 A1 3/2021 Tomono et al. ... G03G 21/1619
2021/0063946 A1 3/2021 Watanabe et al. ............
　　　　　　　　　　　　　　　　　G03G 21/1619

* cited by examiner

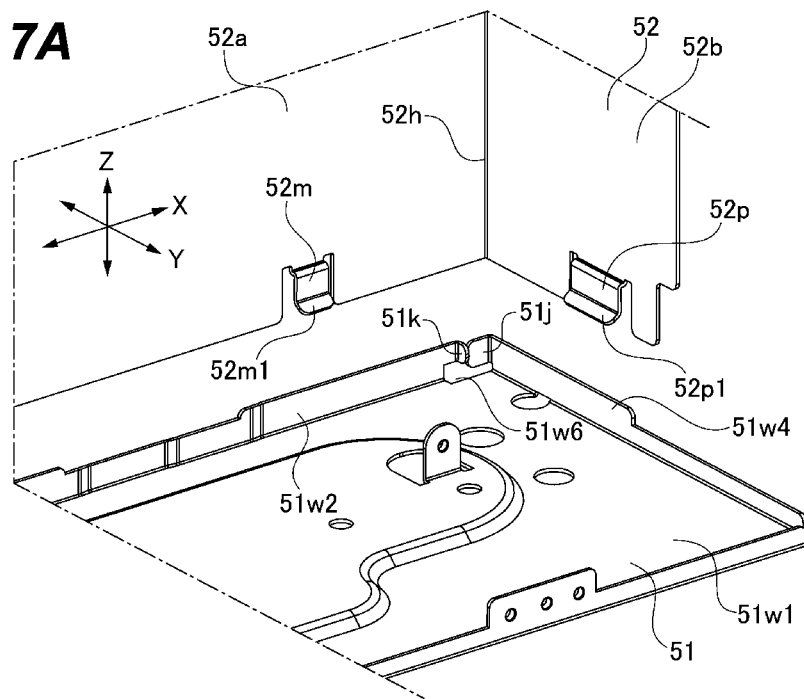
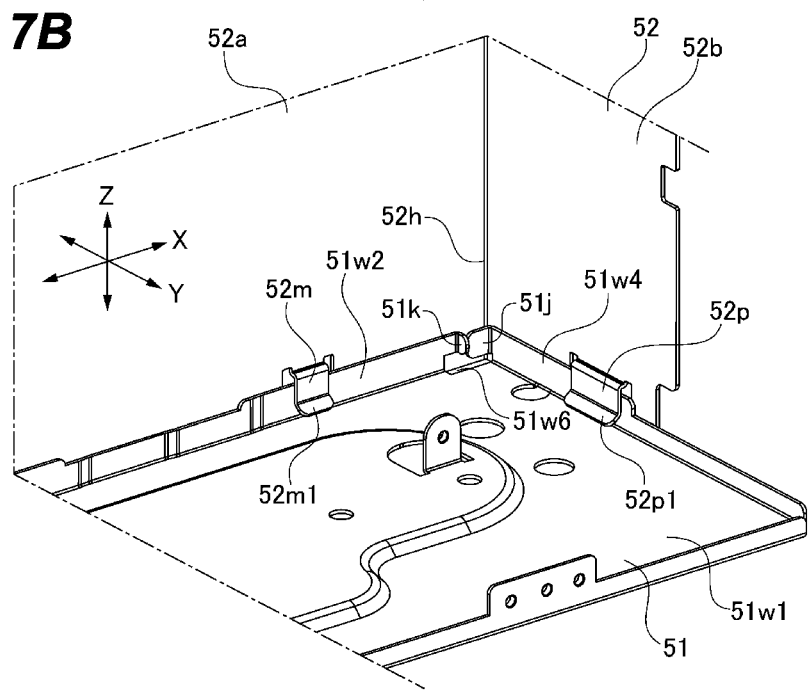

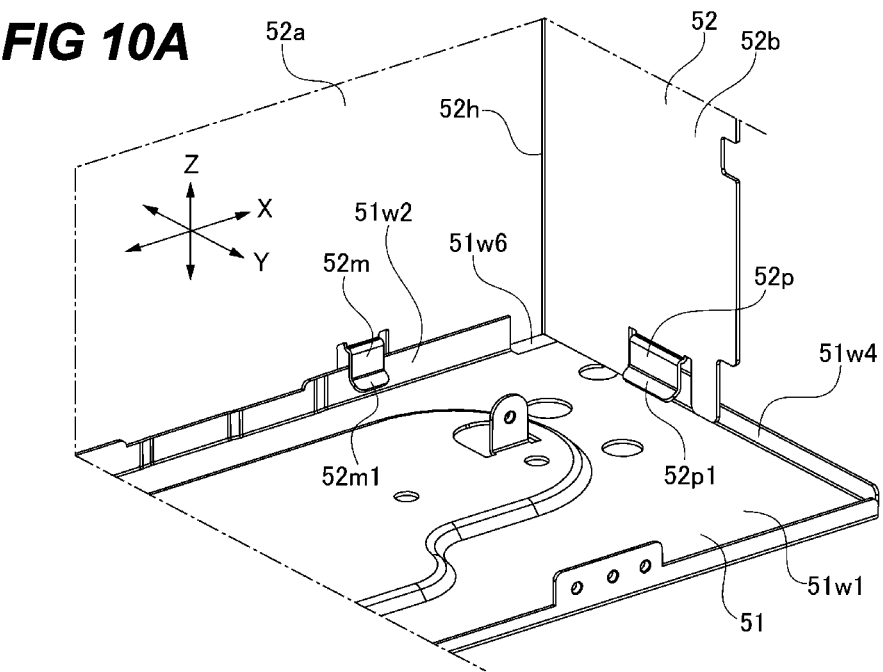
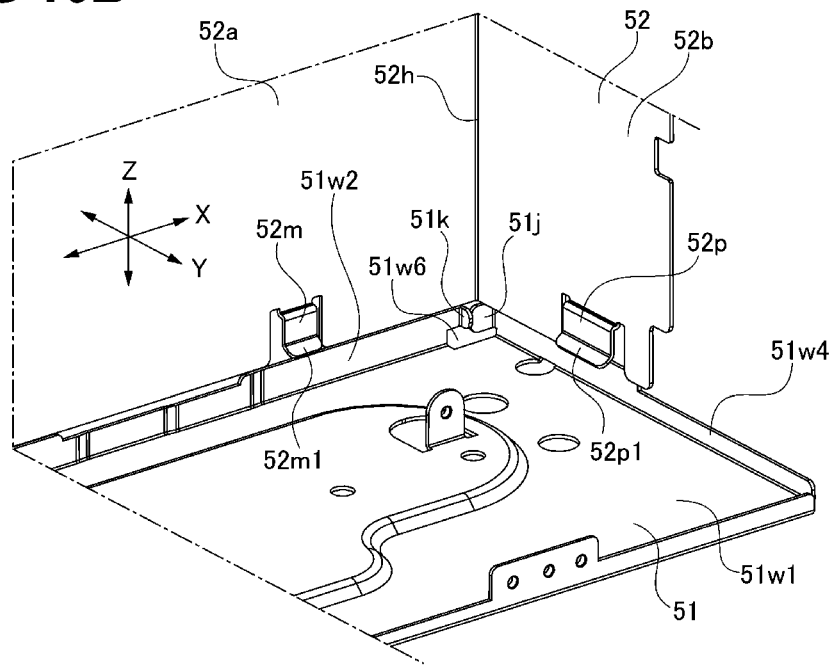

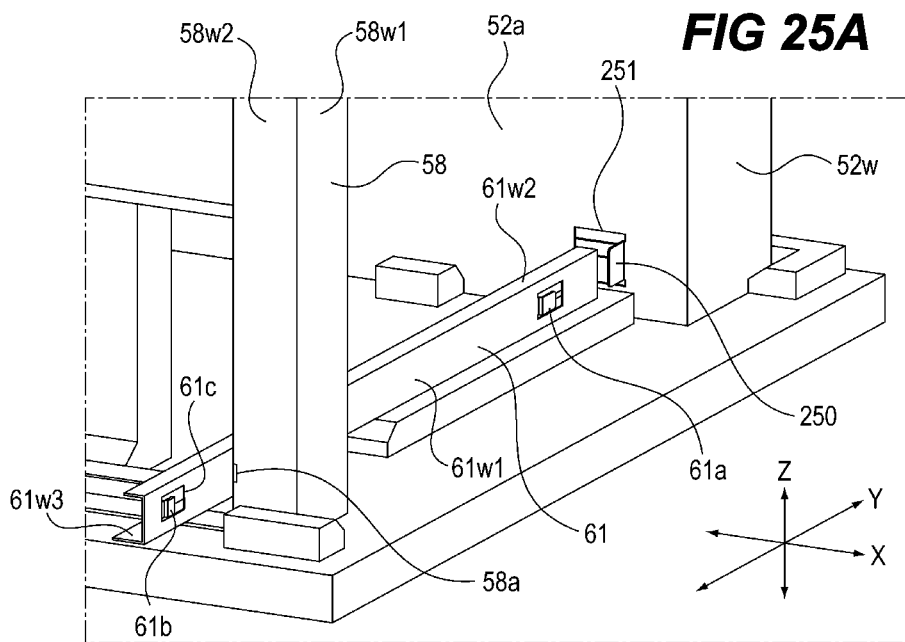
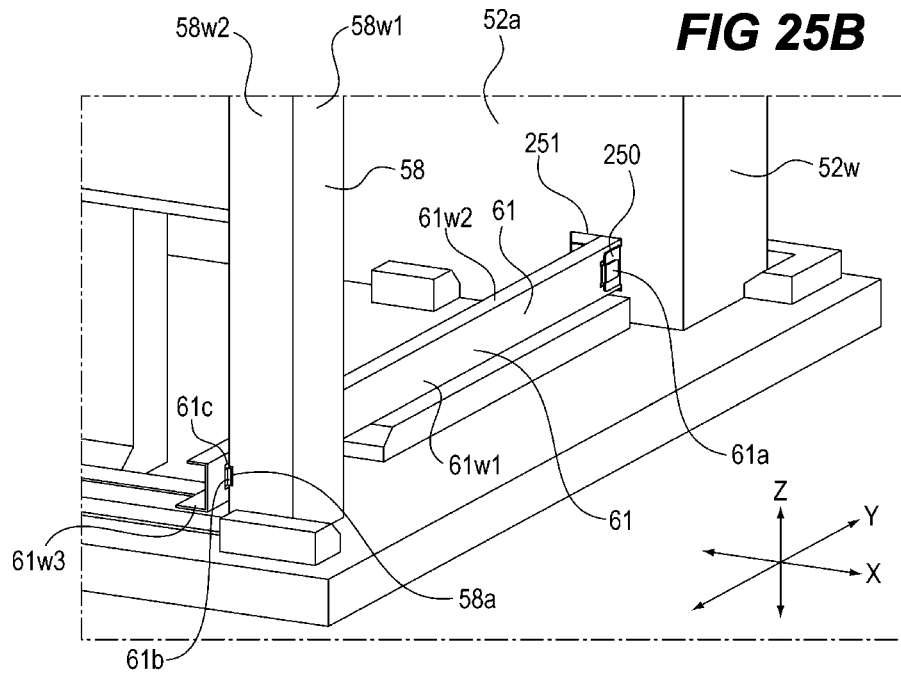

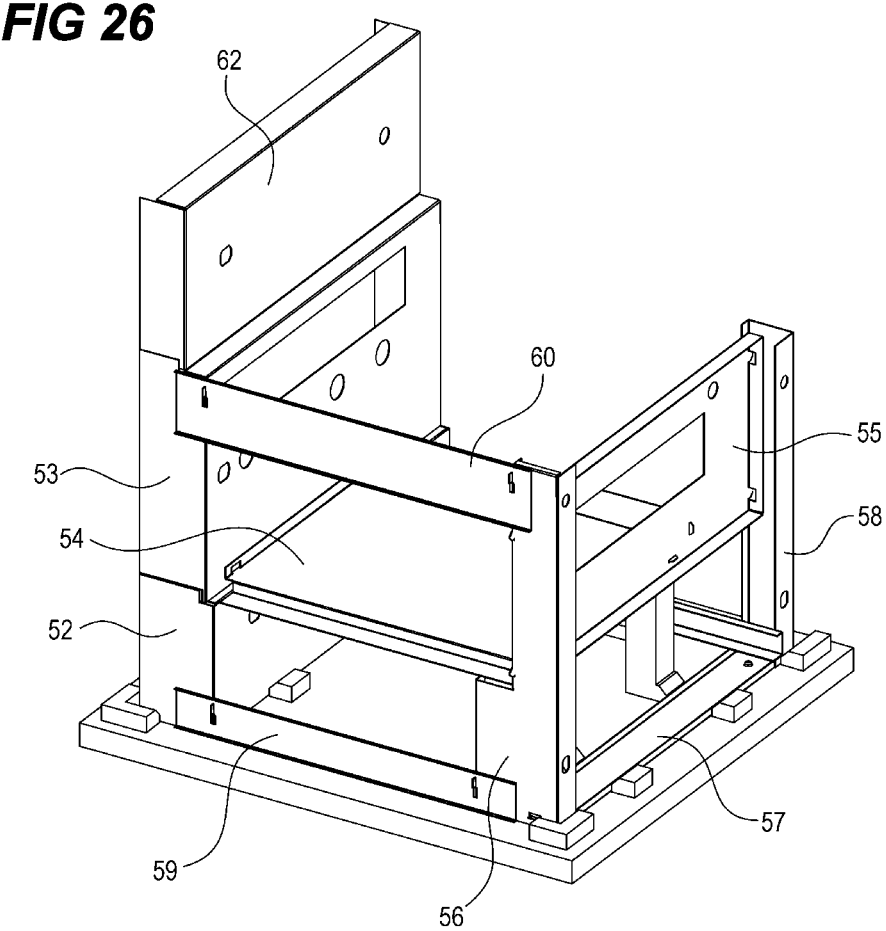
FIG 26
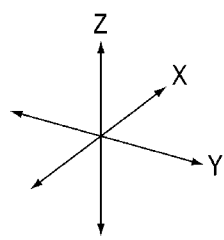

METAL FRAME OF IMAGE FORMING APPARATUS AND IMAGE FORMING APPARATUS

BACKGROUND OF THE INVENTION

Field of the Invention

The present invention relates to a metal frame of an image forming apparatus such as an electrophotographic copying machine and an electrophotographic printer (for example, a laser beam printer or a light emitting diode (LED) printer).

Description of the Related Art

A frame of an image forming apparatus is generally formed by fixing a plurality of metal plates such as a front side plate, a rear side plate, and a stay connecting between the front side plate and the rear side plate to each other by welding or the like. By fixing such metal plates to each other in a state where they are assembled to each other with high position accuracy, position accuracy between respective members supported by the frame is maintained, such that it becomes possible to form a high-quality image.

Meanwhile, Japanese Patent Application Laid-Open No. 2008-116619 describes a configuration for assembling a first metal plate and a second metal plate, which are metal plates constituting a frame of an image forming apparatus, to each other with high position accuracy. The configuration described in Japanese Patent Application Laid-Open No. 2008-116619 is a configuration in which a protrusion portion formed on the first metal plate is inserted into an opening portion formed in the second metal plate to assemble the first metal plate and the second metal plate to each other. A first bulging portion that abuts on one surface of the protrusion portion of the first metal plate in a plate thickness direction and a second bulging portion that abuts on the other surface of the first metal plate in the plate thickness direction are formed inside the opening portion of the second metal plate. By nipping the protrusion portion from the plate thickness direction by the first bulging portion and the second bulging portion, a position of the first metal plate with respect to the second metal plate in the plate thickness direction is determined. In addition, in a direction orthogonal to an insertion direction of the first metal plate into the second metal plate and the plate thickness direction of the first metal plate, by making a width of the opening portion and a width of the protrusion portion substantially the same as each other, a position of the first metal plate with respect to the second metal plate in the orthogonal direction is determined.

When two metal plates constituting the frame of the image forming apparatus are assembled and positioned, it is preferable that one metal plate can be easily assembled to the other metal plate. However, when the difference between the size of the opening and the plate thickness and width of the protrusion portion is increased in order to realize this, positioning accuracy between metal plates may decrease, and position accuracy between each member supported by the frame may deteriorate, adversely affecting image quality. As described above, in the conventional configuration, in a configuration in which the metal plates engage with each other to be positioned, it was difficult to achieve both easy assembly and improvement of the positioning accuracy.

SUMMARY OF THE INVENTION

It is desirable to provide a metal frame of an image forming apparatus that can achieve both easy assembly of two metal plates constituting a metal frame and improvement of positioning accuracy between the two metal plates.

A representative configuration of the present invention provides a metal frame of an image forming apparatus, including:
a first support configured to support one end of an image forming unit that forms an image on a sheet, the first support including a first metal plate and a second metal plate which supports the first metal plate below the first metal plate in a vertical direction;
a second support which is spaced apart from the first support and configured to support the other end of the image forming unit; and
a third support configured to connect the first support and the second support to each other,
wherein the first metal plate includes
a first portion, and
a second portion which is bent substantially vertically from the first portion, and including a substantially right-angled corner portion being provided between the first portion and the second portion,
wherein the second metal plate includes
a third portion,
a fourth portion which is bent substantially vertically upward in the vertical direction from an end portion in a first direction orthogonal to the vertical direction in the third portion, and engages with and is assembled to the first portion, and
a fifth portion which is bent substantially vertically upward in the vertical direction from an end portion in a second direction orthogonal to the vertical direction and the first direction in the third portion, and engages with and is assembled to the second portion,
wherein the fifth portion includes a first stretched portion which extends along the end portion in the second direction with respect to the third portion and a second stretched portion which is bent substantially vertical with respect to the first stretched portion and extends along the second direction, another corner portion located between the first stretched portion and the second stretched portion facing the corner portion of the first metal plate, and
wherein a tip of the second stretched portion faces the fourth portion.

Further features of the present invention will become apparent from the following description of exemplary embodiments with reference to the attached drawings.

BRIEF DESCRIPTION OF THE DRAWINGS

FIGS. 7A and 7B are perspective views of an engaging portion between the rear bottom plate and the rear side plate.

FIGS. 10A and 10B are perspective views of the engaging portion between the rear bottom plate and the rear side plate;

FIGS. 25A and 25B are perspective views of the right lower stay, the rear side plate, and the right support column;

FIG. 26 is a perspective view when the rear side plate is assembled;

DESCRIPTION OF THE EMBODIMENTS

<Image Forming Apparatus>

Hereinafter, an overall configuration of an image forming apparatus according to the present invention will be described with reference to the drawings, together with an operation at the time of image formation. Note that dimensions, materials, shapes, relative arrangements, and the like of components described below are not intended to limit the scope of the present invention unless specifically stated otherwise.

An image forming apparatus A according to the present embodiment is an intermediate tandem type electrophotographic image forming apparatus that transfers toners of four colors of yellow Y, magenta M, cyan C, and black K to an intermediate transfer belt, and then transfers an image to a sheet to form the image. Note that in the following description, Y, M, C, and K are added as subscripts to members using the toners of the respective colors, but since configurations or operations of the respective members are substantially the same as each other except that colors of the toners used in the respective members are different from each other, the subscripts are appropriately omitted unless it is necessary to distinguish the configurations or the operations of the respective members from each other.

Figure 1:
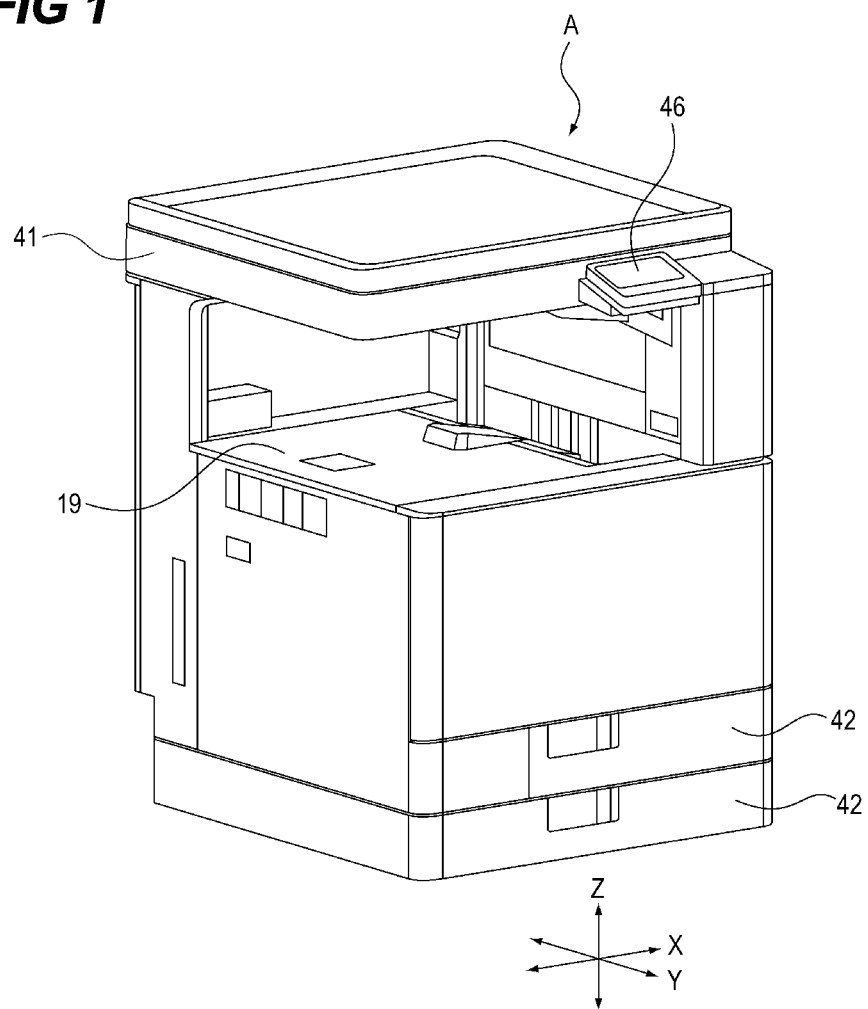
FIG. 1 is a schematic perspective view of an image forming apparatus.
Figure 2:
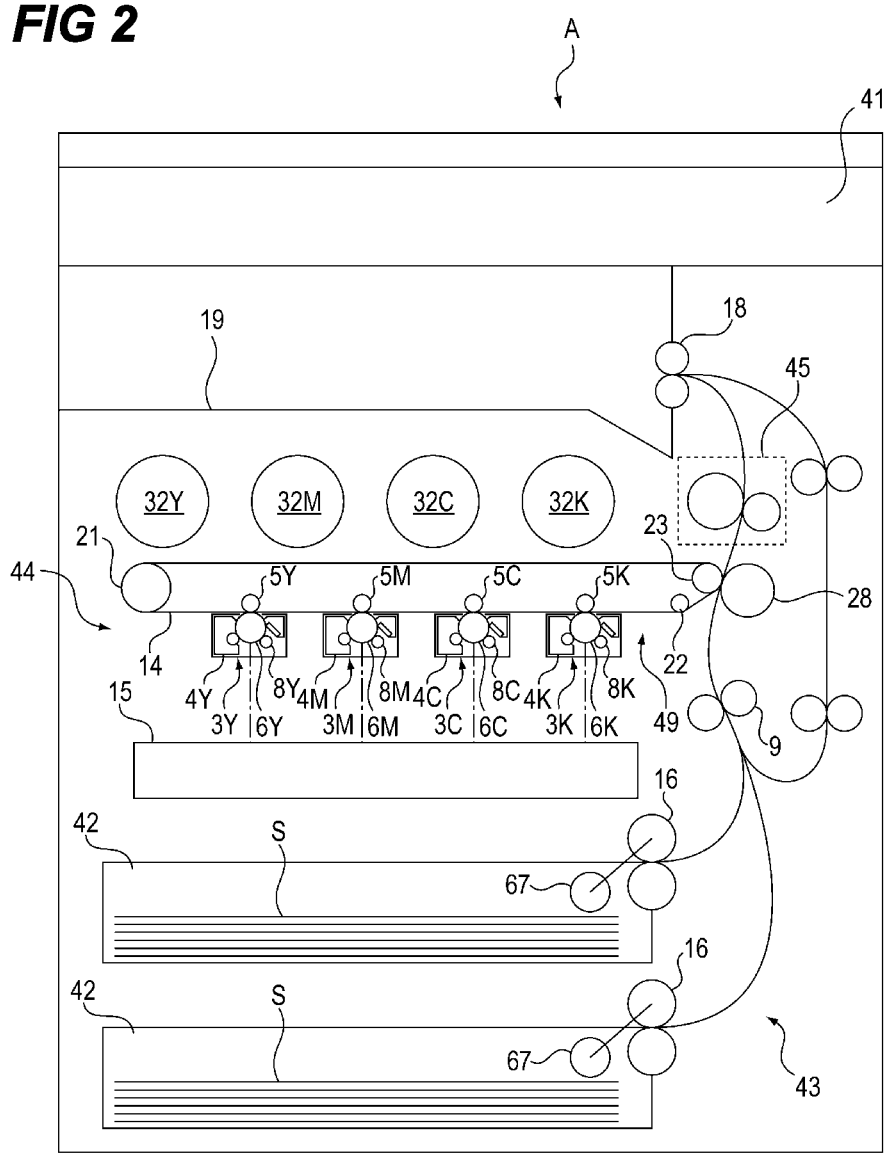
FIG. 2 is a schematic cross-sectional view of the image forming apparatus.

FIG. 1 is a schematic perspective view of an image forming apparatus A. FIG. 2 is a schematic cross-sectional view of an image forming apparatus A. As illustrated in FIGS. 1 and 2, the image forming apparatus A includes an image forming portion 44 that forms a toner image and transfers the toner image to a sheet, a sheet feeding portion 43 that feeds the sheet toward the image forming portion 44, and a fixing portion 45 that fixes the toner image to the sheet. In addition, an image reading portion 41 that reads an image of an original is provided at an upper portion of the image forming apparatus A.

The image forming portion 44 includes a process cartridge 3: 3Y, 3M, 3C, and 3K, a laser scanner unit 15, and an intermediate transfer unit 49. The process cartridge 3, which is an example of the image forming unit, is configured to be detachably attached to the image forming apparatus A, and includes a photosensitive drum 6: 6Y, 6M, 6C, and 6K, a charging roller 8: 8Y, 8M, 8C, and 8K, and a developing device 4: 4Y, 4M, 4C, and 4K.

The intermediate transfer unit 49 includes a primary transfer roller 5: 5Y, 5M, 5C, and 5K, an intermediate transfer belt 14, a secondary transfer roller 28, a secondary transfer counter roller 23, a driving roller 21, and a tension roller 22. The intermediate transfer belt 14 is stretched over the secondary transfer counter roller 23, the driving roller 21, and the tension roller 22, the driving roller 21 rotates by a driving force of a motor (not illustrated), and the intermediate transfer belt 14 circularly moves according to the rotation of the tension roller 22.

Next, an image forming operation by the image forming apparatus A will be described. First, when an image forming job signal is input to a controller (not illustrated), a sheet S stacked and stored in a sheet cassette 42 is sent out to a registration roller 9 by a feeding roller 16. Next, the sheet S is sent into a secondary transfer portion including the secondary transfer roller 28 and the secondary transfer counter roller 23 at a predetermined timing by the registration roller 9.

Meanwhile, in the image forming portion, first, a surface of the photosensitive drum 6Y is charged by the charging roller 8Y. Then, the laser scanner unit 15 irradiates the surface of the photosensitive drum 6Y with laser light according to an image signal transmitted from an external device (not illustrated) or the like to form an electrostatic latent image on the surface of the photosensitive drum 6Y.

Then, a yellow toner is attached to the electrostatic latent image formed on the surface of the photosensitive drum 6Y by the developing device 4Y to form a yellow toner image on the surface of the photosensitive drum 6Y. The toner image formed on the surface of the photosensitive drum 6Y is primarily transferred to the intermediate transfer belt 14 by applying a bias to the primary transfer roller 5Y.

Magenta, cyan, and black toner images are also formed on the photosensitive drums 6M, 6C, and 6K by a similar process. These toner images are transferred in a superimposed manner onto the yellow toner image on the intermediate transfer belt 14 by applying a primary transfer bias to the primary transfer rollers 5M, 5C, and 5K. As a result, a full-color toner image is formed on a surface of the intermediate transfer belt 14.

Note that when the toner inside the developing device 4 is used by the developing process described above, such that an amount of toner inside the developing device 4 decreases, each developing device 4 is replenished with a toner of each color by a toner bottle 32: 32Y, 32M, 32C, and 32K. The toner bottle 32 is configured to be detachably attachable to the image forming apparatus A.

Then, the intermediate transfer belt 14 circularly moves, such that a full-color toner image is sent to the secondary transfer portion. The full-color toner image on the intermediate transfer belt 14 is transferred to the sheet S by applying a bias to the secondary transfer roller 28 in the secondary transfer portion.

Then, the sheet S to which the toner image is transferred is subjected to heating and pressuring processing in the fixing portion 45, such that the toner image on the sheet S is fixed to the sheet S. Then, the sheet S to which the toner image is fixed is discharged to a discharge portion 19 by a discharge roller 18.

<Frame of Image Forming Apparatus>

Next, a frame 31 (metal frame) of the image forming apparatus A will be described.

Figure 3:
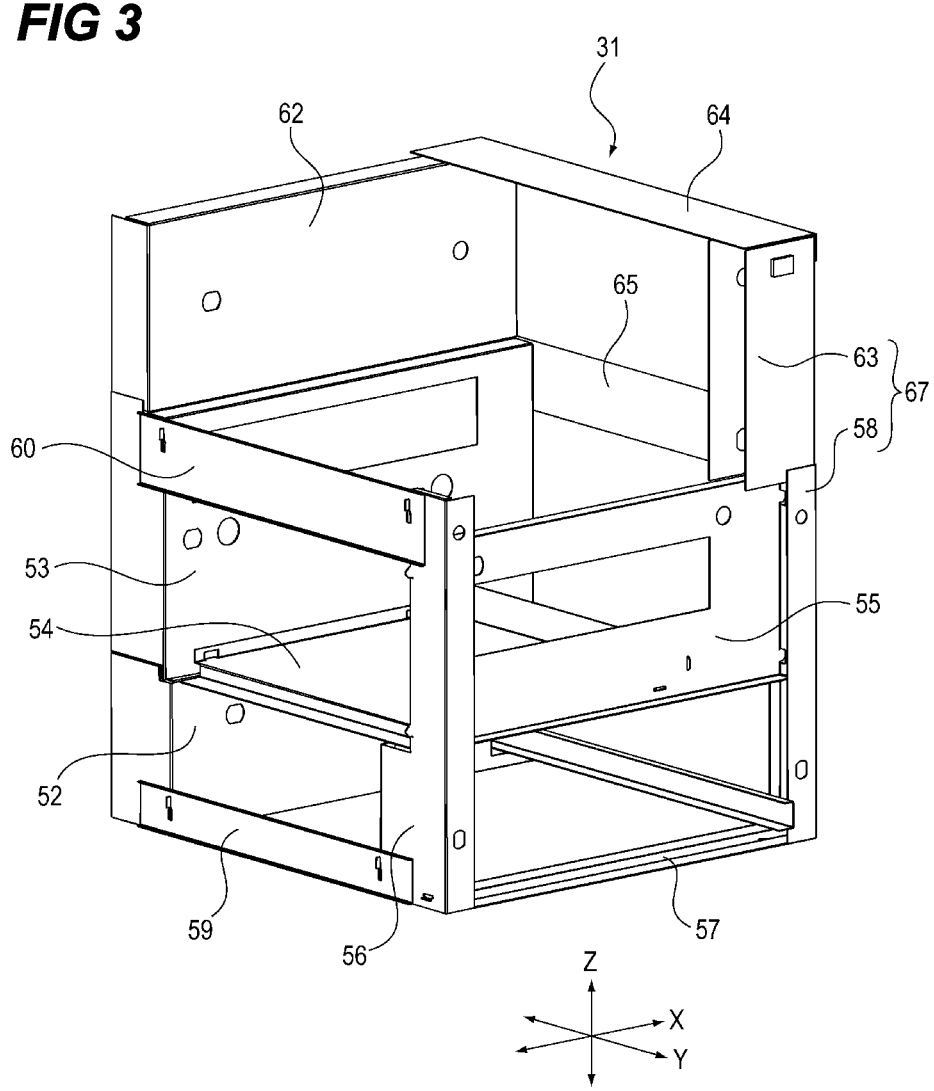
FIG. 3 is a perspective view of the frame of the image forming apparatus.
Figure 4:
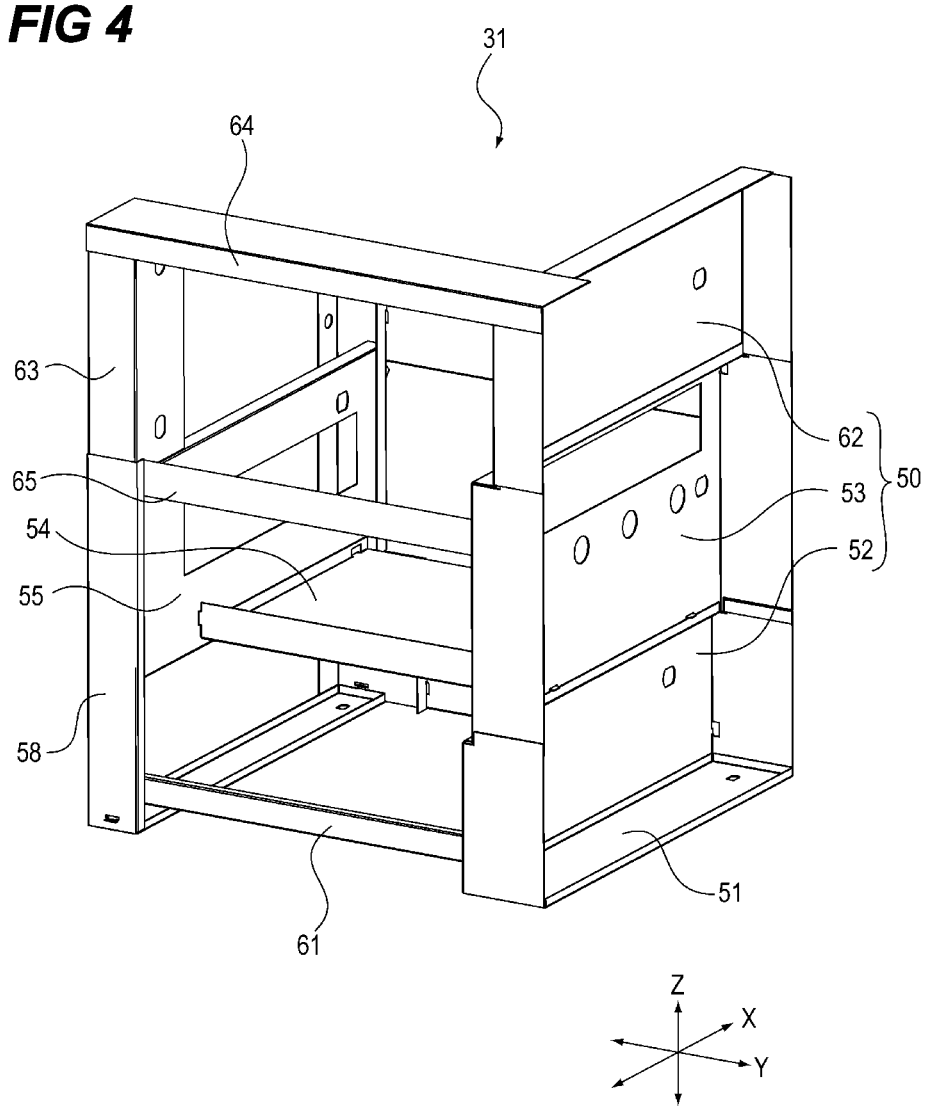
FIG. 4 is a perspective view of the frame of the image forming apparatus.

FIG. 3 is a perspective view of the frame 31 of the image forming apparatus A when viewed from a front surface side of the image forming apparatus A, and is a perspective view of a state where an internal unit such as an image forming unit or an exterior cover is removed from the frame 31. FIG. 4 is a perspective view of the frame 31 of the image forming apparatus A when viewed from a rear surface side of the image forming apparatus A. Note that an arrow X direction illustrated in the drawings is a horizontal direction and indicates a left and right direction of the image forming apparatus A. In addition, an arrow Y direction is a horizontal direction and indicates a front and rear direction of the image forming apparatus A. In addition, an arrow Z direction is a vertical direction and indicates an up and down direction of the image forming apparatus A. In addition, a front side of the image forming apparatus A is a side on which a user normally stands in order to operate an operation portion 46 for performing a setting regarding image formation, and a rear side of the image forming apparatus A is a side opposite to the front side across the frame 31. In addition, a left side of the image forming apparatus A is a left side when viewed from the front side, and a right side of the image forming apparatus A is a right side when viewed from the front side. In addition, the front side of the image forming apparatus A is a direction in which the sheet cassette 42 is pulled out from the image forming apparatus A when the sheet cassette 42 is replenished with sheets, and is a direction in which the toner bottle 32 is pulled out when the toner bottle 32 is replaced.

As illustrated in FIGS. 3 and 4, the image forming apparatus A includes, as a second support, a front side plate 55 (third side plate), a left support column 56 (first support column), and a right support column 67 (second support column). The front side plate 55, the left support column 56, and the right support column 67 are formed by metal plates, and are the frame 31 of the front side of the image forming apparatus A. The left support column 56 is connected to one end side of the front side plate 55 in the arrow X direction to support the front side plate 55. The right support column 67 is connected to the other end side of the front side plate 55 in the arrow X direction to support the front side plate 55. In addition, the right support column 67 includes a right support column 58 and a right support column 63 connected to an upper side of the right support column 58 in the vertical direction. The left support column 56 and the right support column 58 are connected to each other by a front lower stay 57 and the front side plate 55.

Further, the image forming apparatus A includes, as a first support, a rear side plate 50 and a rear bottom plate 51. the rear side plate 50 and the rear bottom plate 51 are formed by metal plates, and are the frame 31 of the back side of the image forming apparatus A. The rear side plate 50 is arranged to face the front side plate 55, and supports the process cartridge 3 together with the front side plate 55. The rear side plate 50 is divided into three as a rear side plate 52, a rear side plate 53, and a rear side plate 62 in the vertical direction, the rear side plate 53 (first side plate) is connected above the rear side plate 52 (second side plate) in the vertical direction, and the rear side plate 62 is connected above the rear side plate 53 in the vertical direction. In addition, a thickness of the metal plate of each of the rear side plates 52, 53, and 62 is about 0.6 mm to 2 mm.

In addition, the image forming apparatus A includes a left lower stay 59, a left upper stay 60, a right lower stay 61, a right middle stay 65, a right upper stay 64, and a middle stay 54, as connecting member connecting the frame 31 on the front surface side and the frame 31 on the rear surface side to each other. Here, the left lower stay 59, the left upper stay 60, the right lower stay 61, the right middle stay 65, the right upper stay 64, and the middle stay 54 are example of a third support and a connecting member connecting the rear side plate 50 constituting the rear surface of the frame 31 to the front side plate 55, the left support column 56 and the right support column 67, constituting the front surface of the frame 31. The left lower stay 59 connects the left support column 56 and the rear side plate 52 to each other. The left upper stay 60 connects the left support column 56 and the rear side plate 53 to each other. The right lower stay 61 connects the right support column 58 and the rear side plate 52 to each other. The right middle stay 65 connects the rear side plate 53 and the right support column 58 to each other. The right upper stay 64 connects the right support column 63 and the rear side plate 62 to each other. The middle stay 54 connects the front side plate 55 and the rear side plate 53 to each other.

Note that each of the members constituting the frame 31 described above is formed of one metal plate. These metal plates are processed into a predetermined shape by drawing or the like, temporarily assembled in an assembly process described later, and then fixed through a fixing process to form the frame 31.

<Frame Assembling Process>

Next, a process of assembling a plurality of metal plates constituting the frame 31 will be described. FIGS. 5 to 30 are views illustrating aspects where the metal plates constituting the frame 31 are assembled.

Figure 5:
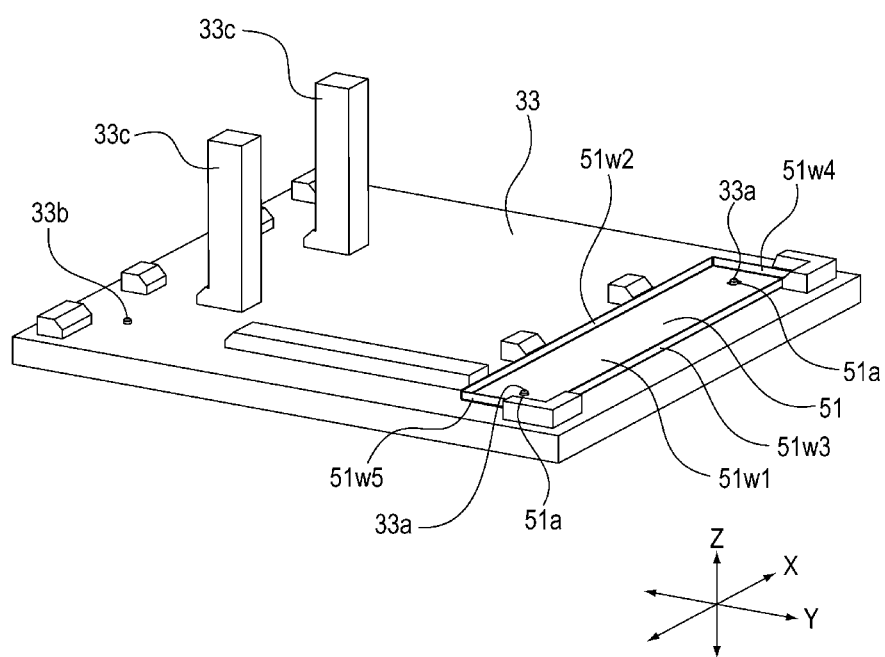
FIG. 5 is a perspective view when a rear bottom plate is assembled.

As illustrated in FIG. 5, a stand 33 as a first jig is used when the metal plates constituting the frame 31 are assembled. The stand 33 has a base portion provided with positioning pins 33$a$ and 33$b$, and a support column 33$c$ erected on the base portion. First, the rear bottom plate 51 is placed on the stand 33.

The rear bottom plate 51 (second metal plate) is provided with a flat surface portion 51$w$1 (third portion) that faces the stand 33 and extends in the horizontal direction. Further, the rear bottom plate 51 includes a bent and raised portion 51$w$2 (fourth portion) and a bent and raised portion 51$w$3 in which one end portion and the other end portion in the arrow Y direction (first direction) orthogonal to the vertical direction (arrow Z direction) of the flat surface portion 51$w$1 are bent substantially vertically (89° to 90°) upward in the vertical direction, respectively. Further, the rear bottom plate 51 includes a bent and raised portion 51$w$4 (fifth portion) and a bent and raised portion 51$w$5 in which one end portion and the other end portion in the arrow X direction (second direction) orthogonal to the vertical direction (arrow Z direction) and an arrow Y direction of the flat surface portion 51w1 are bent substantially vertically (89° to 90°) upward in the vertical direction, respectively. The bent and raised portions 51w2 to 51w5 are formed at least on a side engaging with the rear side plate 52.

When the rear bottom plate 51 is placed on the stand 33, the positioning pin 33a of the stand 33 is inserted into the positioning hole 51a formed in the flat surface portion 51w1 of the rear bottom plate 51. As a result, the position of the rear bottom plate 51 with respect to the stand 33 is determined.

Figure 6A:
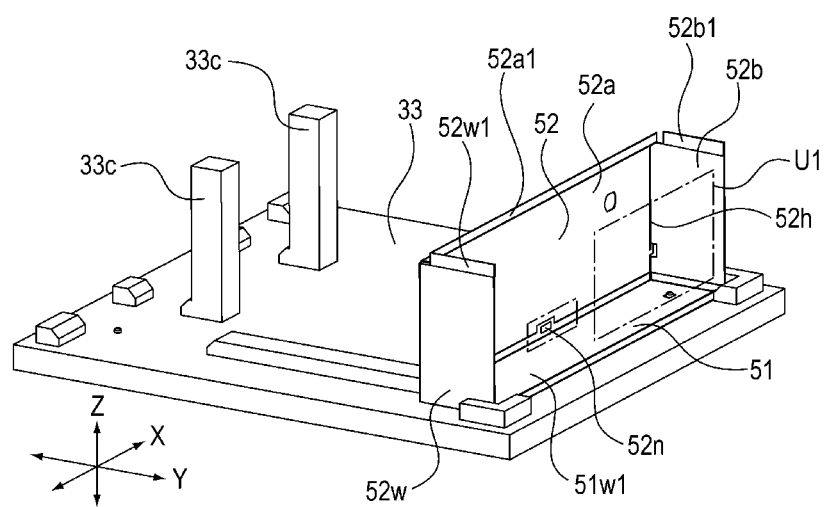
FIGS. 6A and 6B are perspective views when a rear side plate is assembled.
Figure 6B:
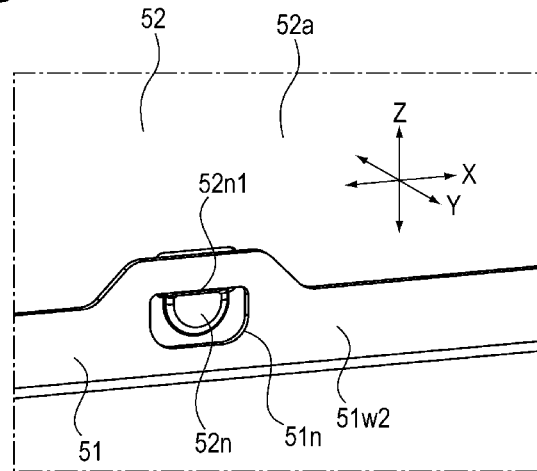

Next, as illustrated in FIGS. 6A and 6B, the rear side plate 52 (first metal plate) is inserted into the rear bottom plate 51 from the vertical direction (arrow Z direction) and assembled. The rear side plate 52 is subjected to bending so as to have a U-shape having three flat surfaces. The rear side plate 52 includes a flat surface portion 52a (first portion) located on the rear surface of the image forming apparatus A and a bent portion 52b (second portion) that is bent so that the bending angle is substantially vertical (89° to 91°) to the flat surface portion 52a and extends to the rear of the image forming apparatus A. The flat surface portion 52a and the bent portion 52b form a corner portion 52h by bending. In addition, the rear side plate 52 includes a bent portion 52w bent with respect to the flat surface portion 52a so as to face the bent portion 52b.

The upper portion of the flat surface portion 52a of the rear side plate 52 is provided with a stepped portion 52a1 bent in the plate thickness direction (arrow Y direction) of the flat surface portion 52a so that a step is formed in the arrow Y direction with the flat surface portion 52a. The upper portion of the bent portion 52b of the rear side plate 52 is provided with a stepped portion 52b1 bent in the plate thickness direction (arrow X direction) of the bent portion 52b so that a step is formed in the arrow X direction with the bent portion 52b. The upper portion of the bent portion 52w of the rear side plate 52 is provided with a stepped portion 52w1 bent in the plate thickness direction (arrow X direction) of the bent portion 52w so that a step is formed in the arrow X direction with the bent portion 52w.

As illustrated in FIG. 6B, the flat surface portion 52a of the rear side plate 52 is provided with a projection portion 52n formed so as to protrude in the plate thickness direction by drawing. In addition, a through-hole 51n penetrating the bent and raised portion 51w2 in a plate thickness direction (arrow Y direction) of the bent and raised portion 51w2 is formed in the bent and raised portion 51w2 of the rear bottom plate 51. When the rear side plate 52 is assembled, the projection portion 52n of the rear side plate 52 engages with the through-hole 51n of the rear bottom plate 51. As a result, an edge portion 52n1 of the projection portion 52n abuts on an inner wall of the through-hole 51n, such that movement of the rear side plate 52 with respect to the rear bottom plate 51 in a direction opposite to the insertion direction is restricted.

Figure 8:
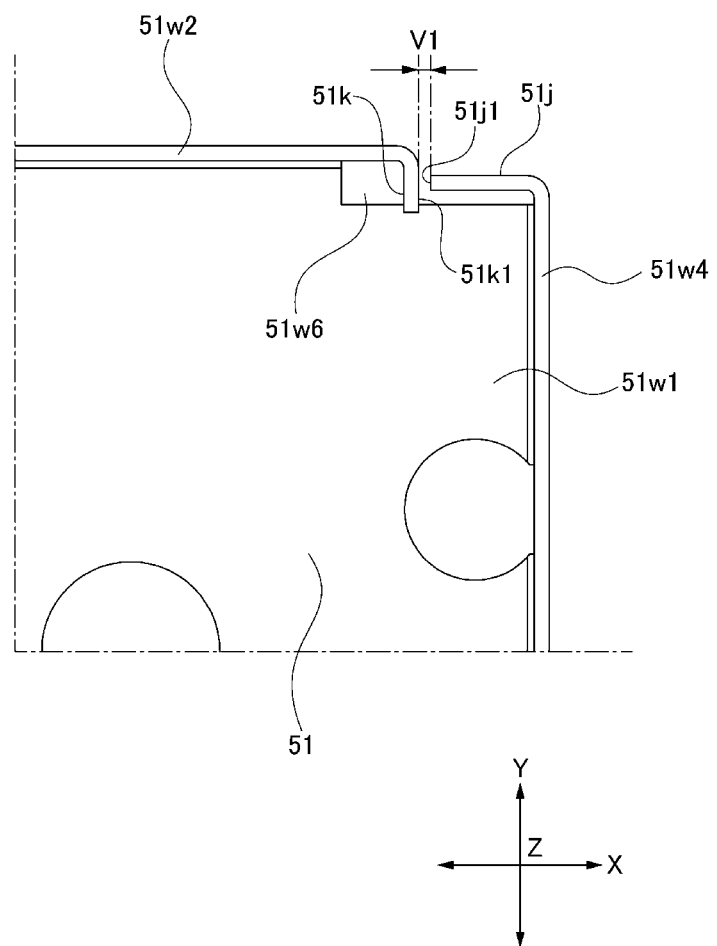
FIG. 8 is a top view of the rear bottom plate.

FIGS. 7A and 7B are perspective view of a region U1 illustrated in FIGS. 6A and 6B. Here, FIG. 7A illustrates a state before the rear side plate 52 is assembled to the rear bottom plate 51. FIG. 7B illustrates a state before the rear side plate 52 is assembled to the rear bottom plate 51. FIG. 8 is a top view of the rear bottom plate 51 in the region U1 illustrated in FIGS. 6A and 6B.

As illustrated in FIGS. 7 and 8, a step-bent portion 52m (first engaging portion) is formed in the lower portion of the flat surface portion 52a of the rear side plate 52. The step-bent portion 52m has a portion (first bent portion) bent in the plate thickness direction (arrow Y direction) of the flat surface portion 52a and a portion (second bent portion) bent and extended from that portion in an insertion direction (arrow Z direction) of the rear bottom plate 51. A tip portion of the step-bent portion 52m is an inclined portion 52m1 inclined in a direction away from the flat surface portion 52a of the rear side plate 52 with respect to the insertion direction of the rear bottom plate 51 into the rear side plate 52.

In addition, a step-bent portion 52p (second engaging portion) is provided at a lower portion of the bent portion 52b of the rear side plate 52. The step-bent portion 52p has a portion (third bent portion) bent in a plate thickness direction (arrow X direction) of the bent portion 52b and a portion (fourth bent portion) bent and extended from that portion with respect to the insertion direction of the rear bottom plate 51. A tip portion of the step-bent portion 52p is an inclined portion 52p1 inclined in a direction away from the bent portion 52b of the rear side plate 52 with respect to the insertion direction of the rear side plate 52 into the rear bottom plate 51.

When the rear side plate 52 is assembled, the step-bent portions 52m and 52p of the rear side plate 52 engages with the bent and raised portions 51w2 and 51w4 of the rear bottom plate 51. At this time, the inclined portions 52m1 and 52p1 of the rear side plate 52 abut on the bent and raised portions 51w2 and 51w4 of the rear bottom plate 51, such that movement of the rear side plate 52 in the arrow Z direction is guided. As a result, the step-bent portion 52m and the flat surface portion 52a on the rear side plate 52 is sandwiched by the bent and raised portion 51w2 of the rear bottom plate 51 from the plate thickness direction, and the bent and raised portion 51w4 of the rear bottom plate 51 is sandwiched by the step-bent portion 52p and the bent portion 52b from the plate thickness direction. In this way, the positions of the rear side plate 52 with respect to the rear bottom plate 51 in the arrow X direction and the arrow Y direction are determined.

In addition, when the rear side plate 52 is inserted into the rear bottom plate 51 up to a position where a lower end portion of the rear side plate 52 abuts on a surface of the stand 33 on which the rear bottom plate 51 is placed or a position where portions of the step-bent portions 52m and 52p bent and raised from the flat surface portions 52a and the bent portion 52b abut on an upper end portion of the bent and raised portion 51w2 of the rear bottom plate 51, positions of the rear side plate 52 and the rear bottom plate 51 in the arrow Z direction are determined, such that a final relative position between the rear bottom plate 51 and the rear side plate 52 is determined.

Further, the bent and raised portions 51w2 and 51w4 of the rear bottom plate 51 are provided with bent portions 51j (second bent portion) and 51k (first bent portion) that close at least a part of a notch portion 51w6 formed in the rear bottom plate 51. The notch portion 51w6 is a notch required for bending when forming the bent and raised portions 51w2 and 51w4 of the rear bottom plate 51.

The bent portion 51j is formed by being bent substantially vertically (89° to 91°) in the arrow X direction from the end portion of the bent and raised portion 51w4 in the arrow Y direction toward the bent and raised portion 51w2. The bent portion 51k is formed by being bent substantially vertically (89° to 91°) in the arrow Y direction from the end portion of the bent and raised portion 51w2 in the arrow X direction toward the bent and raised portion 51w4. A tip portion 51j1 of the bent portion 51j is a portion of the bent and raised portion 51w4 closest to the bent and raised portion 51w2. In other words, a side surface portion 51k1 of the bent portion 51k is a portion of the bent and raised portion 51w2 closest to the bent and raised portion 51w4. A gap V1 between the tip portion 51j1 of the bent portion 51j and the side surface portion 51k1 of the bent portion 51k illustrated in FIG. 8 is equal to or less than a thickness of the bent portion 52b of the rear side plate 52. It should be noted that the bent portion 51j and the bent portion 51k may be brought into contact with each other without providing the gap V1. The bent and raised portion 51w4 is an example of a first extending portion extending in the arrow Y direction, and the bent portion 51j is an example of a second extending portion extending in the arrow X direction bent with respect to the bent and raised portion 51w4. In addition, the bent and raised portion 51w2 is an example of a third extending portion extending in the arrow X direction, and the bent portion 51k is an example of a fourth extending portion extending in the arrow Y direction substantially bent right-angled with respect to the bent and raised portion 51w2.

Figure 9A:
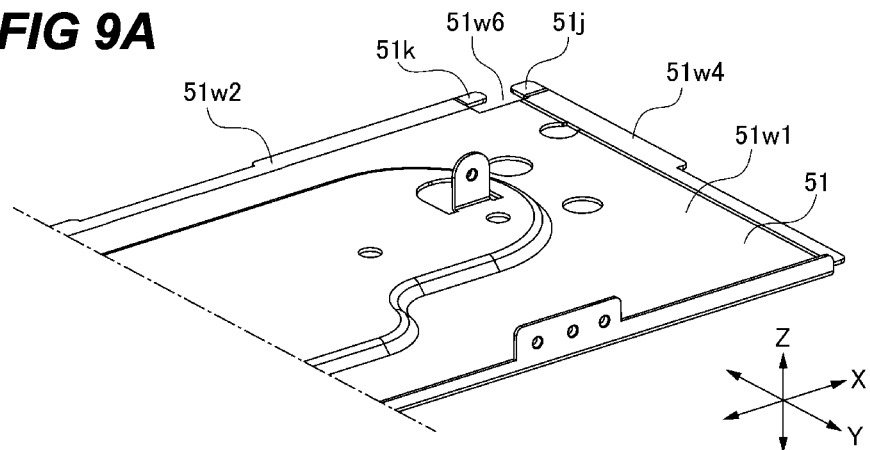
FIGS. 9A to 9C are perspective views sequentially illustrating a processing method of the rear bottom plate.
Figure 9B:
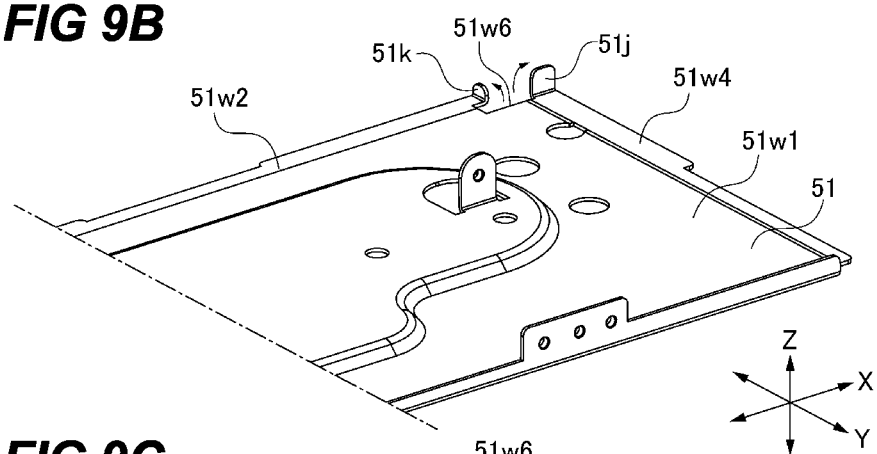
Figure 9C:
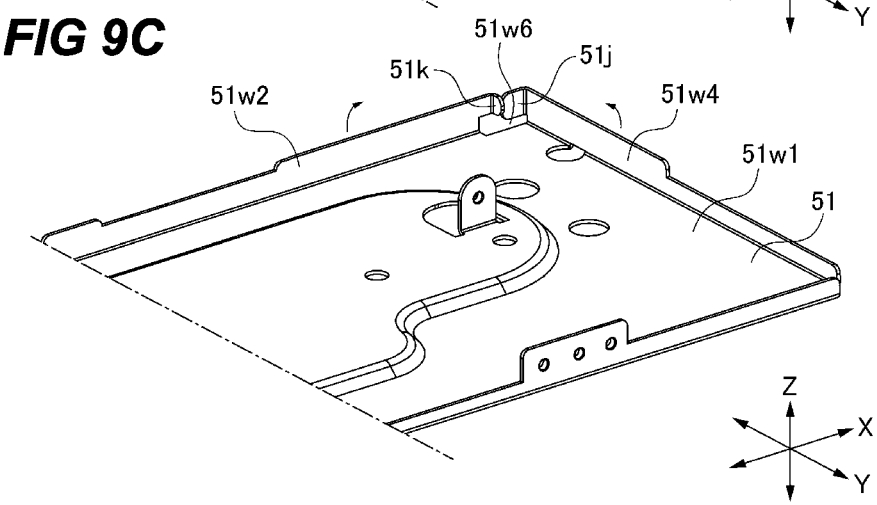

FIGS. 9A to 9C are perspective views illustrating a processing method of the bent and raised portions 51w2 and 51w4 and the bent portions 51j and 51k in order. As illustrated in FIGS. 9A and 9B, when forming the bent and raised portions 51w2 and 51w4 and the bent portions 51j and 51k, first, the bent portions 51j and 51k are formed by bending the corner portions around the notch portion 51w6 on the rear bottom plate 51 almost vertically upward in the vertical direction, respectively. Next, as illustrated in FIG. 9C, one end portion of the flat surface portion 51w1 in the arrow X direction and one end portion in the arrow Y direction are bent substantially vertically upward in the vertical direction to form the bent and raised portions 51w2 and 51w4, respectively. In this way, the bent and raised portions 51w2 and 51w4 and the bent portions 51j and 51k are bent.

When the rear side plate 52 is assembled to the rear bottom plate 51, the following effects are obtained by providing the rear bottom plate 51 with bent portions 51j and 51k. That is, as illustrated in FIG. 10A, in the case where the bent portion 51j is not provided, when the rear side plate 52 is inserted into the rear bottom plate 51, the corner portion 52h of the rear side plate 52 enters a space above the notch portion 51w6, and thus, there is a possibility that both the bent portion 52b and the step-bent portion 52p of the rear side plate 52 are inserted into one side of the rear bottom plate 51 with respect to the bent and raised portion 51w4. In this case, since the step-bent portion 52p does not engage and the bent and raised portion 51w4 of the rear bottom plate 51 cannot be sandwiched between the bent portion 52b and the step-bent portion 52p of the rear side plate 52, the relative position accuracy between the rear bottom plate 51 and the rear side plate 52 deteriorates.

On the other hand, as illustrated in FIG. 10B, the rear bottom plate 51 is provided with the bent portion 51j so the rear side plate 52 is inserted into the rear bottom plate 51 at the above-described erroneous position, the lower end portion of the bent portion 52b of the rear side plate 52 interferes with the bent portion 51j of the rear bottom plate 51. Therefore, the rear side plate 52 cannot be inserted into the rear bottom plate 51 to the end. Therefore, it is possible to prevent the rear side plate 52 from being assembled at an erroneous position with respect to the rear bottom plate 51, and to prevent the relative position accuracy between the rear bottom plate 51 and the rear side plate 52 from deteriorating.

Figure 11A:
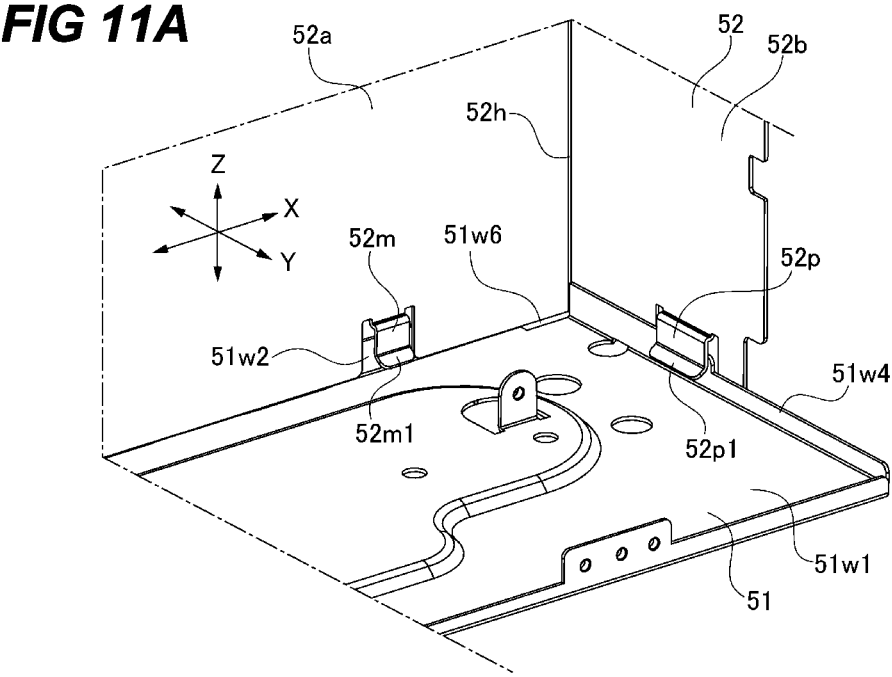
FIGS. 11A and 11B are perspective views of the engaging portion between the rear bottom plate and the rear side plate.

In addition, as illustrated in FIG. 11A, in the case where the bent portion 51k is not provided, when the rear side plate 52 is inserted into the rear bottom plate 51, the corner portion 52h of the rear side plate 52 enters a space above the notch portion 51w6, and thus, there is a possibility that both the flat surface portion 52a and the step-bent portion 52m of the rear side plate 52 are inserted into one side of the bent and raised portion 51w2. In this case, the step-bent portion 52m does not engage, and the flat surface portion 52a and the step-bent portion 52m of the rear side plate 52 cannot sandwich the bent and raised portion 51w2 of the rear bottom plate 51, so the relative position accuracy between the rear bottom plate 51 and the rear side plate 52 deteriorates.

Figure 11B:
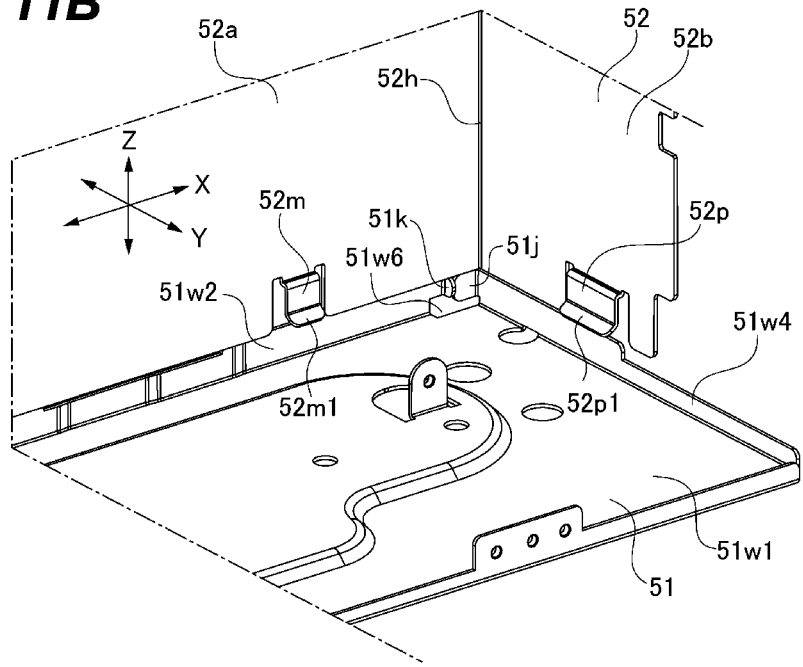
Figure 12A:
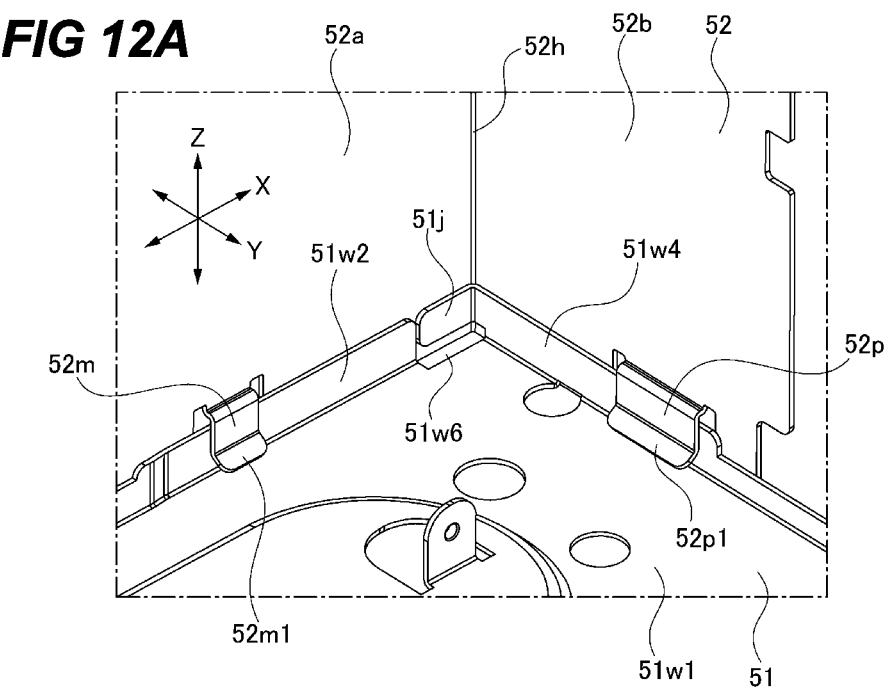
FIGS. 12A and 12B are perspective views of the engaging portion between the rear bottom plate and the rear side plate.
Figure 12B:
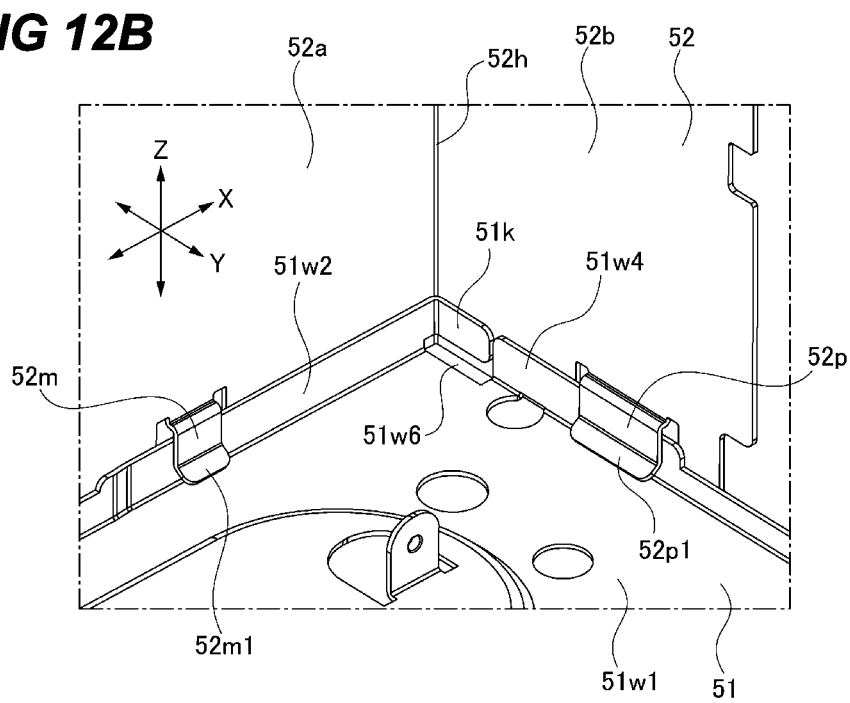

On the other hand, as illustrated in FIG. 11B, the rear bottom plate 51 is provided with the bent portion 51k so the rear side plate 52 is inserted into the rear bottom plate 51 at the above-described erroneous position, the lower end portion of the flat surface portion 52a of the rear side plate 52 interferes with the bent portion 51k of the rear bottom plate 51. Therefore, the rear side plate 52 cannot be inserted into the rear bottom plate 51 to the end. Therefore, it is possible to prevent the rear side plate 52 from being assembled at an erroneous position with respect to the rear bottom plate 51, and to prevent the relative position accuracy between the rear bottom plate 51 and the rear side plate 52 from deteriorating.

That is, in order to secure the strength of the rear bottom plate 51 and to assemble the rear side plate 52, the rear bottom plate 51 needs to be provided with the bent and raised portions 51w2 to 51w5. In order to bend the bent and raised portion 51w2 to 51w5, a notch such as the notch portion 51w6 is required. When the notch portion 51w6 is left as it is, as illustrated in FIGS. 10A and 11A, the rear side plate 52 enters the space above the notch portion 51w6, and thus, there is a possibility that the rear side plate 52 is assembled at the erroneous position.

On the other hand, the bent portions 51j and 51k are provided to close at least a part of the notch portion 51w6, and when viewed from the vertical direction, the portion of the bent and raised portion 51w4 that comes into contact with or is closest to the bent and raised portion 51w2 is arranged at a position different from the corner portion 52h of the rear side plate 52. With such a configuration, when the rear side plate 52 is to be assembled at the above-described erroneous position, the bent and raised portions 51w2 and 51w4 interfere with the rear side plate 52 to restrict the assembly, so it is possible to prevent the rear side plate 52 from being assembled at the erroneous position. Therefore, according to the configuration of the present embodiment, it is possible to achieve both ease of assembly of the rear bottom plate 51 and the rear side plate 52, which are the two metal plates constituting the frame 31, and improve positioning accuracy.

Although the present embodiment has described a configuration in which at least a part of the notch portion 51w6 is closed by the two bent portions 51j and 51k of the rear bottom plate 51 to prevent the rear side plate 52 from being inserted into an erroneous position, the present invention is not limited thereto. That is, as long as when viewed from the vertical direction, the portion that comes in contact with or closest to the bent and raised portion 51w2 in the bent and raised portion 51w4 is arranged at a position different from the corner portion 52h of the rear side plate 52, the same effect as described above can be obtained. For example, the configuration illustrated in FIG. 12A in which the notch portion 51w6 is closed by one bent portion 51j, or the configuration illustrated in FIG. 12B in which the notch portion 51w6 is closed by one bent portion 51k may be used.

Figure 13A:
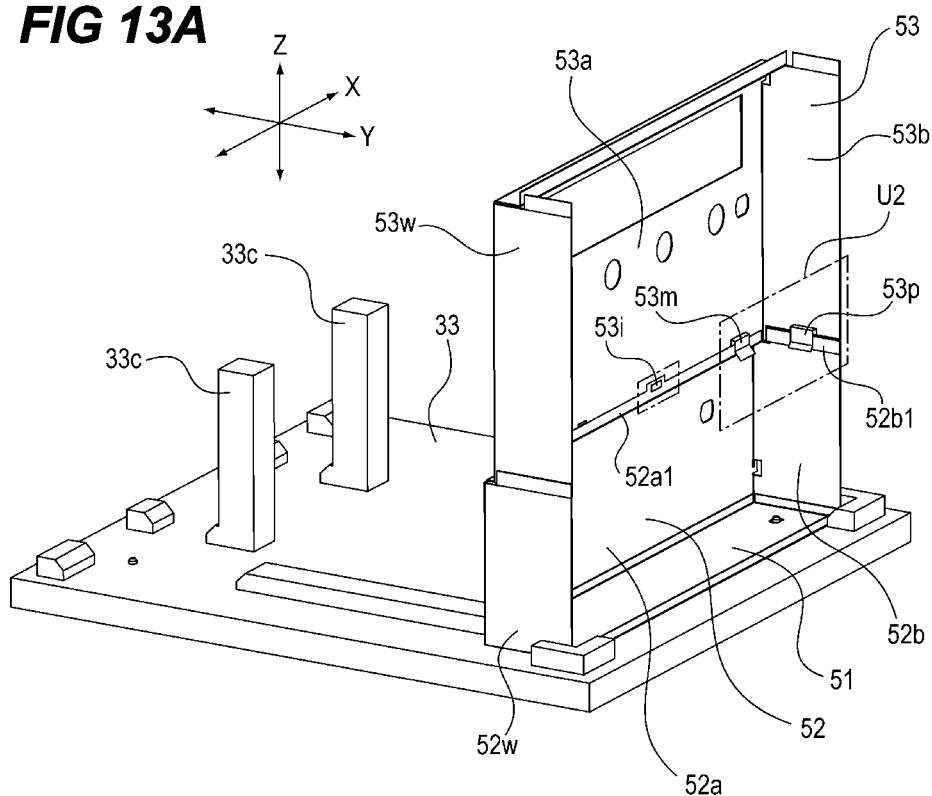
FIGS. 13A and 13B are perspective views when the rear side plate is assembled.
Figure 13B:
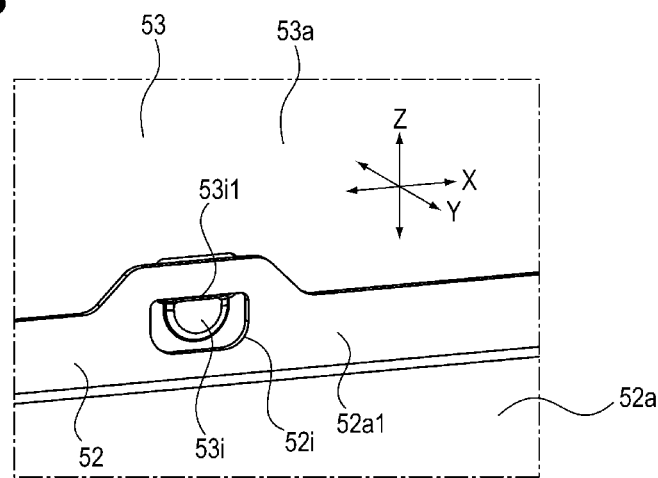

Next, as illustrated in FIGS. 13A and 13B, the rear side plate 53 supporting the process cartridge 3 is inserted into the rear side plate 52 from the vertical direction (arrow Z direction) and assembled. The rear side plate 53 is subjected to bending so as to have a U-shape having three flat surfaces. The rear side plate 53 is located on the rear surface of the image forming apparatus A, and includes a support portion 53a supporting the process cartridge 3 and a bent portion 53b bent at a bending angle of a substantially right angle (89° to 91°) with respect to the support portion 53a and extending rearward of the image forming apparatus A. The support portion 53a and the bent portion 53b form a corner portion 53h by bending. In addition, the rear side plate 53 includes a bent portion 53w bent with respect to the support portion 53a so as to face the bent portion 53b.

The support portion 53a (first portion) of the rear side plate 53 (first metal plate) is arranged to be adjacent to the flat surface portion 52a in the vertical direction with respect to the flat surface portion 52a (third portion) of the rear side plate 52 (second metal plate). In addition, the bent portion 53b (second portion) of the rear side plate 53 is arranged above the bent portion 52b (fourth portion) of the rear side plate 52 so as to be adjacent to the bent portion 52b. Further, the bent portion 53w of the rear side plate 53 is arranged so as to be adjacent to the bent portion 52w in the vertical direction with respect to the bent portion 52w of the rear side plate 52.

As illustrated in FIG. 13B, the lower portion of the support portion 53a of the rear side plate 53 is provided with a projection portion 53i formed so as to protrude in the plate thickness direction by drawing. Further, a through-hole 52i penetrating in the plate thickness direction (arrow Y direction) is formed in the stepped portion 52a1 of the rear side plate 52. When the rear side plate 53 is assembled, the projection portion 53i of the rear side plate 53 engages with the through-hole 52i of the rear side plate 52. As a result, an edge portion 53i1 of the projection portion 53i abuts on an inner wall of the through-hole 52i, such that movement of the rear side plate 53 with respect to the rear side plate 52 in a direction opposite to the insertion direction is restricted.

Figure 14:
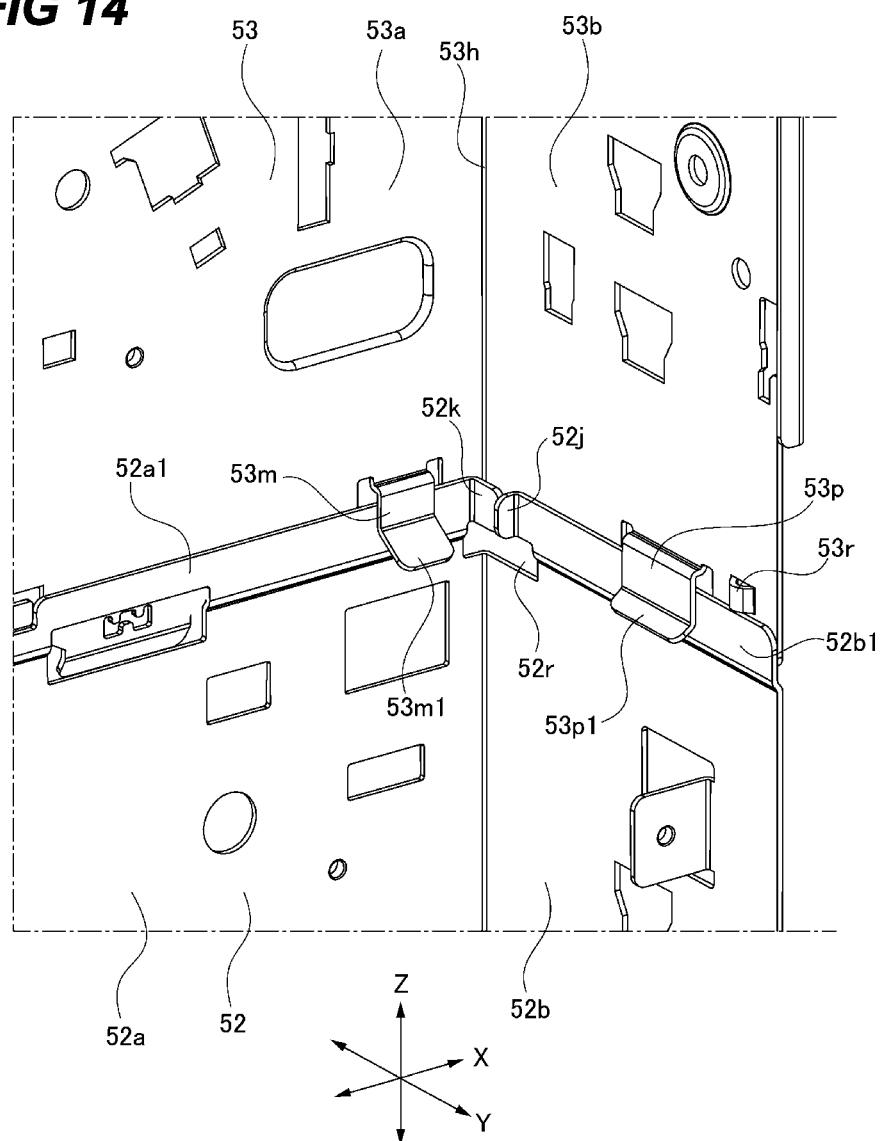
FIG. 14 is a perspective view of the engaging portion between the rear side plates.
Figure 15:
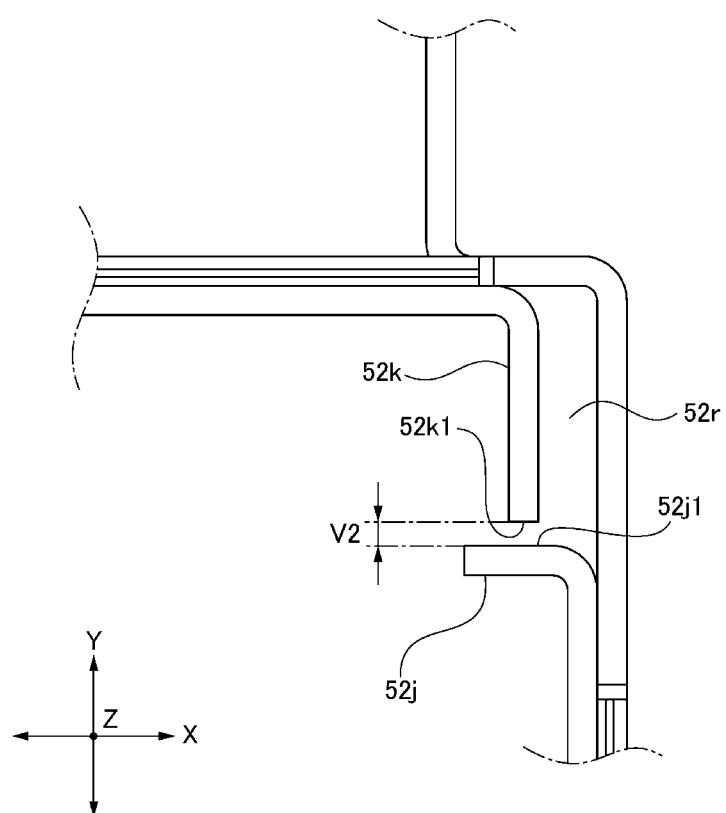
FIG. 15 is a top view of the rear side plate.

FIG. 14 is a perspective view of a region U2 illustrated in FIGS. 13A and 13B. Here, FIG. 14A illustrates a state before the rear side plate 52 is assembled to the rear bottom plate 51. FIG. 14B illustrates a state before the rear side plate 52 is assembled to the rear bottom plate 51. FIG. 15 is a top view of the rear side plate 52 in the region U2 illustrated in FIGS. 13A and 13B.

As illustrated in FIGS. 14 and 15, a step-bent portion 53m (first engaging portion) is formed in the lower portion of the support portion 53a of the rear side plate 53. The step-bent portion 53m has a portion (first bent portion) bent in the plate thickness direction (arrow Y direction) of the support portion 53a and a portion (second bent portion) bent and extended from that portion in an insertion direction (arrow Z direction) of the rear side plate 52. A tip portion of the step-bent portion 53m is an inclined portion 53m1 inclined in a direction away from the support portion 53a of the rear side plate 53 with respect to the insertion direction of the rear side plate 52 into the rear side plate 53.

In addition, a step-bent portion 53p (second engaging portion) and a stopper portion 53r are provided at a lower portion of the bent portion 53b of the rear side plate 53. The stopper portion 53r is formed by press working and protrudes from the bent portion 53b in the arrow X direction. The step-bent portion 53p has a portion (third bent portion) bent in a plate thickness direction (arrow X direction) of the bent portion 53b and a portion (fourth bent portion) bent and extended from that portion in the insertion direction of the rear side plate 52. A tip portion of the step-bent portion 53p is an inclined portion 53p1 inclined in a direction away from the bent portion 53b of the rear side plate 53 with respect to the insertion direction of the rear side plate 52 into the rear side plate 53.

When the rear side plate 53 is assembled, the step-bent portions 53m and 53p of the rear side plate 53 engage with step-bent portion 52a1 (fifth portion) and 52b1 (sixth portion) of the rear side plate 52. At this time, the inclined portions 53m1 and 53p1 of the rear side plate 53 abut on the stepped portions 52a1 and 52b1 of the rear side plate 52, such that movement of the rear side plate 53 in the arrow Z direction is guided. As a result, the stepped portion 52a1 of the rear side plate 52 is sandwiched by the step-bent portion 53m and the support portion 53a on the rear side plate 53 from the plate thickness direction, and the stepped portion 52b1 of the rear side plate 52 is sandwiched by the step-bent portion 53p and the bent portion 53b from the plate thickness direction. In this way, the positions of the rear side plate 53 with respect to the rear side plate 52 in the arrow X direction and the arrow Y direction are determined.

In addition, when the stopper portion 53r of the rear side plate 53 is inserted into a position where the stopper portion 53r abuts on the upper end portion of the stepped portion 52b1 of the rear side plate 52, the positions of the rear side plate 53 with respect to the rear side plate 52 in the arrow Z direction of the rear side plate 53 and the rear side plate 52 are determined. In this way, the final relative position between the rear side plate 53 and the rear side plate 52 is determined.

Further, the stepped portions 52a1 and 52b1 of the rear side plate 52 are provided with bent portions 52j (second bent portion) and 52k (first bent portion) that close at least a part of the notch portion 52r formed in the rear side plate 52. The notch portion 52r is a notch required for bending when forming the stepped portions 52a1 and 52b1 of the rear side plate 52.

The bent portion 52j is formed by being bent substantially vertically (89° to 91°) in the arrow X direction from the end portion of the stepped portion 52a1 in the arrow Y direction toward the stepped portion 52b1. The bent portion 52k is formed by being bent substantially vertically (89° to 91°) in the arrow Y direction from the end portion of the stepped portion 52a1 in the arrow X direction toward the stepped portion 52b1. A tip portion 52k1 of the bent portion 52k is the portion closest to the stepped portion 52b1 in the stepped portion 52a1. In other words, the side surface portion 52j1 of the bent portion 52j is the portion closest to the stepped portion 52a1 in the stepped portion 52b1. A gap V2 between the tip portion 52k1 of the bent portion 52k and the side surface portion 52j1 of the bent portion 52j illustrated in FIG. 15 is equal to or less than the thickness of the support portion 53a of the rear side plate 53. It should be noted that the bent portion 52j and the bent portion 52k may be brought into contact with each other without providing the gap V2.

Figure 16A:
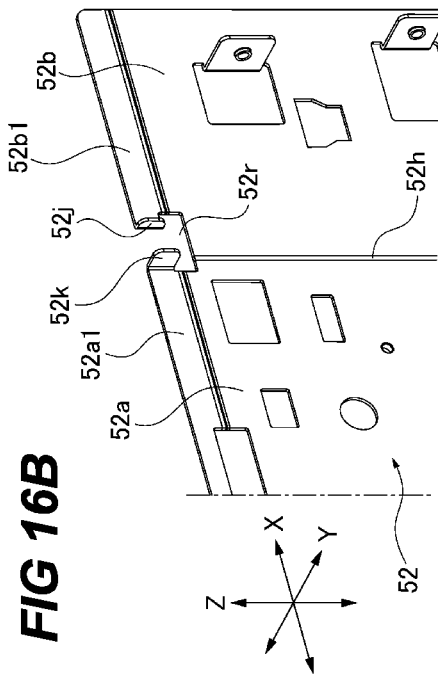
FIGS. 16A to 16D are perspective views sequentially illustrating a processing method of the rear side plate.
Figure 16B:
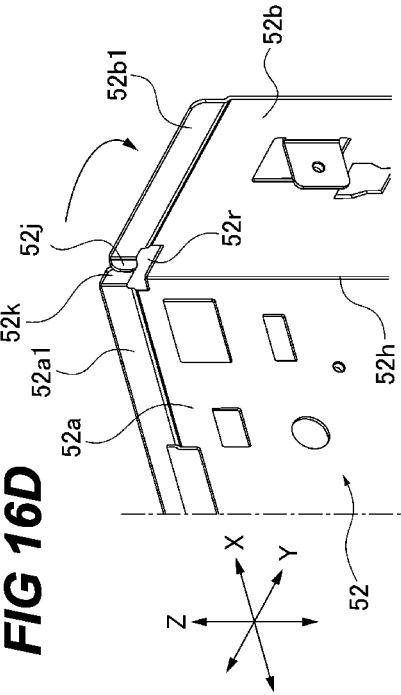
Figure 16C:
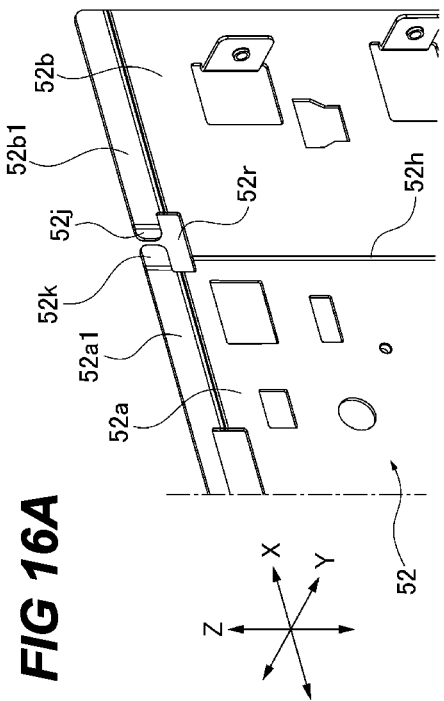
Figure 16D:
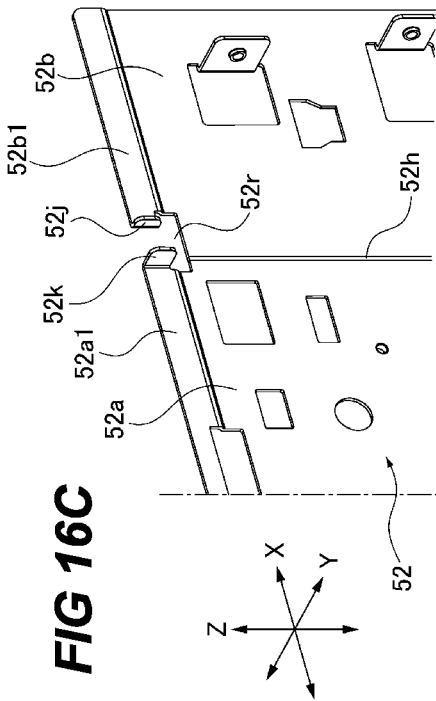

FIGS. 16A to 16D are perspective views illustrating the processing method of the stepped portions 52a1 and 52b1 and the bent portions 52j and 52k in order. As illustrated in FIGS. 16A and 16B, when forming the stepped portions 52a1 and 52b1 and the bent portions 52j and 52k, first, the bent portions 52j and 52k are formed by substantially vertically bending the corner portions around the notch portion 52r on the rear side plate 52 in the arrow Y direction, respectively. Next, as illustrated in FIG. 16C, the upper portions of the flat surface portion 52a and the bent portion 52b in the vertical direction are bent in the direction of the arrow Y to form stepped portions 52a1 and 52b1, respectively. Thereafter, as illustrated in FIG. 16D, the end portion of the flat surface portion 52a in the arrow X direction is bent substantially vertically in the direction of the arrow Y to form the bent portion 52b. In this way, the bent and raised portions 51w2 and 51w4 and the bent portions 51j and 51k are bent.

When the rear side plate 53 is assembled to the rear side plate 52, the following effects are obtained by providing the rear side plate 52 with bent portions 52j and 52k. That is, in the case where the bent portion 52j is not provided, when the rear side plate 53 is inserted into the rear side plate 52, the corner portion 53h of the rear side plate 53 enters the space above the notch portion 52r, and thus, there is a possibility that both the bent portion 53b and the step-bent portion 53p of the rear side plate 53 may be inserted into one side of the rear side plate 52 with respect to the stepped portion 52b1. In this case, the step-bent portion 53p does not engage, and the stepped portion 52b1 of the rear side plate 52 cannot be sandwiched between the bent portion 53b of the rear side plate 53 and the step-bent portion 53p, so the relative position accuracy between the rear side plate 52 and the rear side plate 53 deteriorates.

On the other hand, when the rear side plate 52 is provided with the bent portion 52j so that the rear side plate 53 is inserted into the rear side plate 52 at the above-described erroneous position, the lower end portion of the bent portion 53b of the rear side plate 53 interferes with the bent portion 52j of the rear side plate 52. Therefore, the rear side plate 53 cannot be inserted into the rear side plate 52 to the end. Therefore, it is possible to prevent the rear side plate 53 from being assembled at an erroneous position with respect to the rear side plate 52, and to prevent the relative position accuracy between the rear side plate 53 and the rear side plate 52 from deteriorating.

In addition, in the case where the bent portion 52k is not provided, when the rear side plate 53 is inserted into the rear side plate 52, the corner portion 53h of the rear side plate 53 enters the space above the notch portion 52r, and thus, there is a possibility that both the support portion 53a and the step-bent portion 53m of the rear side plate 53 is inserted into one side with respect to the stepped portion 52a1. In this case, the step-bent portion 53m does not engage, and the stepped portion 52a1 of the rear side plate 52 cannot be sandwiched between the support portion 53a of the rear side plate 53 and the step-bent portion 53m, so the relative position accuracy between the rear side plate 52 and the rear side plate 53 deteriorates.

On the other hand, when the rear side plate 52 is provided with the bent portion 52k so that the rear side plate 53 is inserted into the rear side plate 52 at the above-described erroneous position, the lower end portion of the support portion 53a of the rear side plate 53 interferes with the bent portion 52k of the rear side plate 52. Therefore, the rear side plate 53 cannot be inserted into the rear side plate 52 to the end. Therefore, it is possible to prevent the rear side plate 53 from being assembled at an erroneous position with respect to the rear side plate 52, and to prevent the relative position accuracy between the rear side plate 53 and the rear side plate 52 from deteriorating.

That is, in order to secure the strength of the rear side plate 52, and to align the positions of the flat surface portion 52a of the rear side plate 52 and the support portion 53a of the rear side plate 53, and the positions of the bent portion 52b of the rear side plate 52 and the bent portion 53b of the rear side plate 53, the stepped portions 52a1 and 52b1 are required for the rear side plate 52. In order to bend the stepped portion 52a1 and 52b1, the notch such as the notch portion 52r is required. When the notch portion 52r is left as it is, as described above, the rear side plate 53 may enter the space above the notch portion 52r, and the rear side plate 53 may be assembled at an erroneous position.

On the other hand, the bent portions 52j and 52k are provided to close at least a part of the notch portion 52r, and when viewed from the vertical direction, the portion in contact with or closest to the stepped portion 52a1 in the stepped portion 52b1 is arranged at a position different from the corner portion 53h of the rear side plate 53. With such a configuration, when the rear side plate 53 is to be assembled at the above-described erroneous position, the stepped portions 52a1 and 52b1 interfere with the rear side plate 53 to restrict the assembly, so it is possible to prevent the rear side plate 53 from being assembled at the erroneous position. Therefore, according to the configuration of the present embodiment, it is possible to achieve both ease of assembly of the rear side plate 52 and the rear side plate 53, which are the two metal plates constituting the frame 31, and improve positioning accuracy.

Although the present embodiment has described a configuration in which at least a part of the notch portion 52r is closed by the two bent portions 52j and 52k of the rear side plate 52 to prevent the rear side plate 53 from being inserted into an erroneous position, the present invention is not limited thereto. That is, as long as the portion in contact with or closest to the stepped portion 52a1 in the stepped portion 52b1 when viewed from the vertical direction is arranged at a position different from the corner portion 53h of the rear side plate 53, the same effect as described above can be obtained. For example, similar to the bent portion 51j of the rear bottom plate 51 illustrated in FIG. 12A, one bent portion 52j may be configured to be close to the notch portion 52r, or similar to the bent portion 51k of the rear bottom plate 51 illustrated in FIG. 12B, the notch portion 52r may be configured to be closed by one bent portion 52k.

Figure 17A:
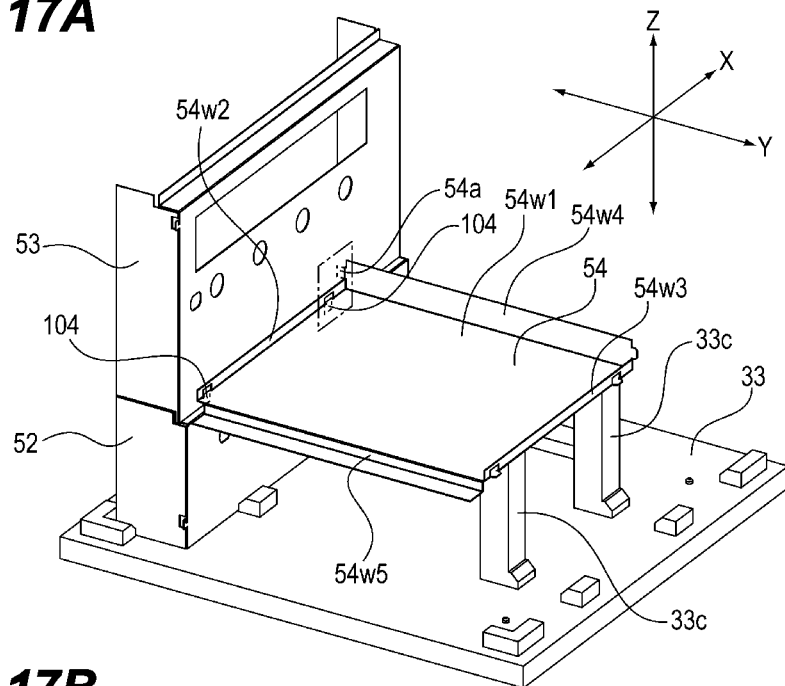
FIGS. 17A and 17B are perspective views when a middle stay is assembled.
Figure 17B:
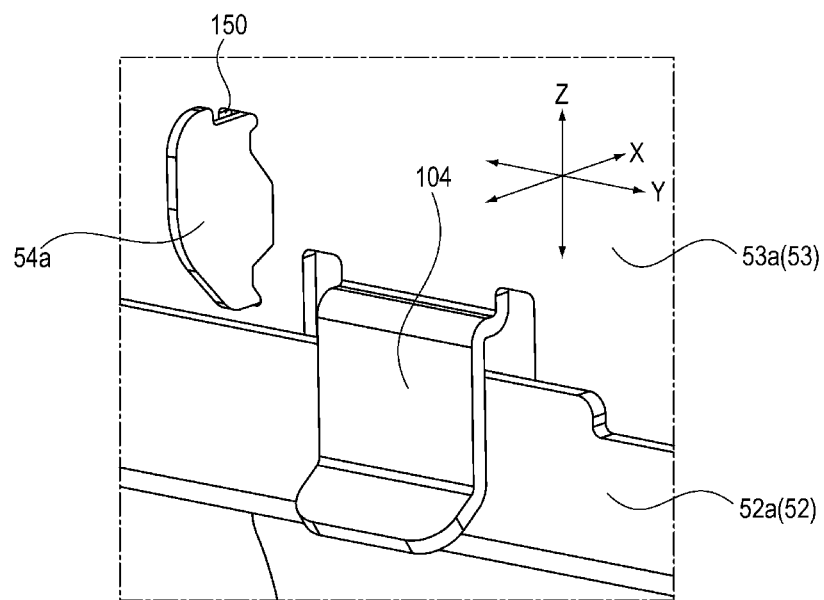

Next, as illustrated in FIGS. 17A and 17B, the middle stay 54 is assembled. The middle stay 54 is an optical stand on which the laser scanner unit 15 is placed, and is one example of the connecting member. The middle stay 54 is arranged on two support columns 33c provided on the stand 33, and is inserted into the support portion 53a of the rear side plate 53. In the present embodiment, the middle stay 54 is a member that supports the laser scanner unit 15, but may be a member that connects the front side plate 55 and the rear side plate 50 at a predetermined distance at a position between the laser scanner unit 15 and the sheet cassette 42 in the vertical direction. Further, if it is an exposure unit that exposes the photosensitive drum 6 by an LED instead of the laser scanner unit 15, the configuration may be such that it is provided between the exposure unit and the sheet cassette 42 in the vertical direction.

The middle stay 54 has a flat surface portion 54w1 extending in the horizontal direction, and a bent and raised portion 54w2 bent and raised vertically and upward from the flat surface portion 54w1 at one end portion of the flat surface portion 54w1 in the arrow Y direction. In addition, the middle stay 54 has a bent and raised portion 54w3 bent vertically from the flat surface portion 54w1 so as to face the bent and raised portion 54w2 and a bent and raised portion 54w4 bent vertically and upward from the flat surface portion 54w1 at one end portion of the flat surface portion 54w1 in the arrow X direction. In addition, the middle stay 54 has a bent portion 54w5 bent vertically and downward from the flat surface portion 54w1 at the other end portion of the flat surface portion 54w1 in the arrow X direction and further extending in the horizontal direction. The bent and raised portion 54w4 of the middle stay 54 is provided with a protrusion portion 54a protruding in an insertion direction (arrow Y direction) into the rear side plate 53. The protrusion portion 54a of the middle stay 54 is inserted into a through-hole 150 formed in the support portion 53a of the rear side plate 53 and penetrating the support portion 53a in a plate thickness direction (arrow Y direction) of the support portion 53a. As a result, a position of the middle stay 54 with respect to the rear side plate 53 in the arrow X direction and the arrow Y direction is determined.

Figure 18A:
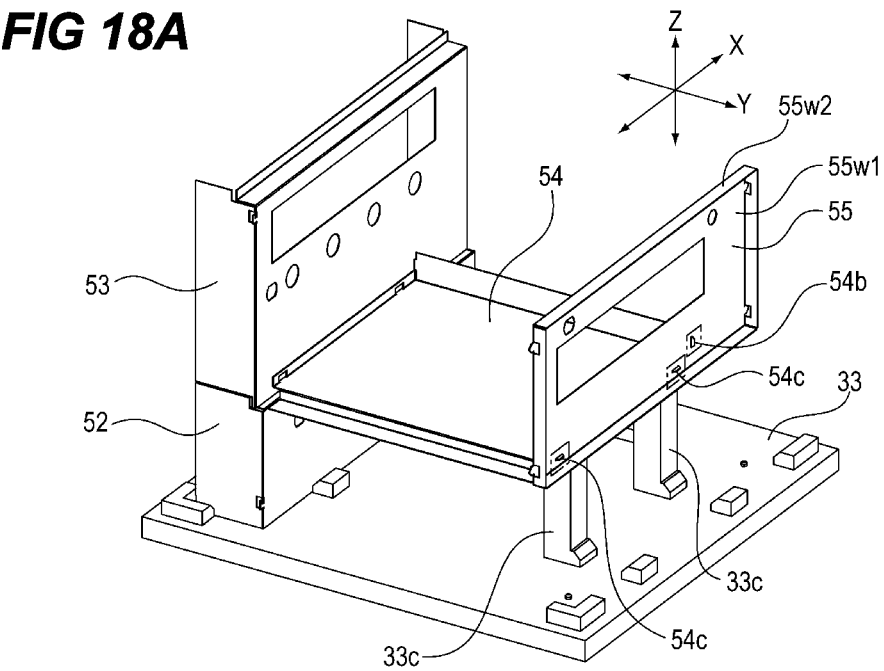
FIGS. 18A to 18C are perspective views when a front side plate is assembled.
Figure 18B:
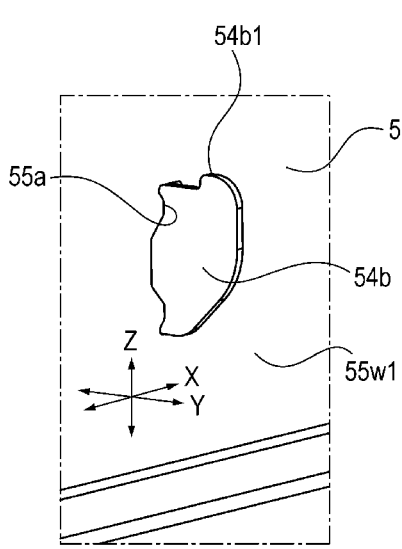
Figure 18C:
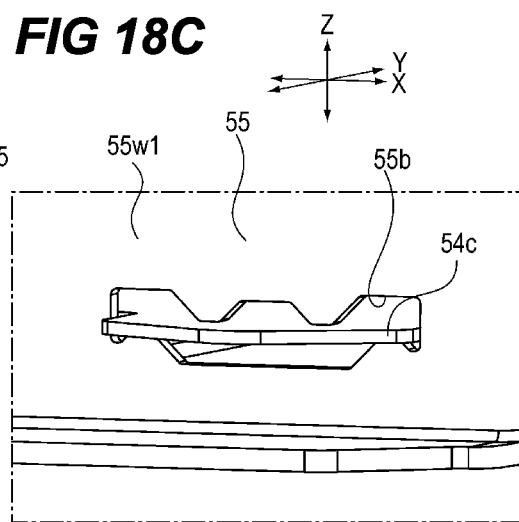

Next, as illustrated in FIGS. 18A to 18C, the front side plate 55 is assembled. The middle stay 54 is inserted into the front side plate 55. The front side plate 55 has a flat surface portion 55w1 extending in the vertical direction and a bent and raised portion 55w2 formed by bending and raising each of both end portions of the flat surface portion 55w1 in the arrow X direction and the arrow Y direction forward of the image forming apparatus A. Through-holes 55a and 55b penetrating in the plate thickness direction (arrow Y direction) thereof is formed in the flat surface portion 55w1 of the front side plate 55. In addition, the bent and raised portion 54w3 of the middle stay 54 is provided with protrusion portions 54b and 54c protruding in an insertion direction (arrow Y direction) into the front side plate 55. A tip portion of the protrusion portion 54b is provided with a hook portion 54b1 protruding upward of a base end portion.

The protrusion portion 54b of the middle stay 54 is inserted into the through-hole 55a formed in the flat surface portion 55w1 of the front side plate 55, and the protrusion portion 54c of the middle stay 54 is inserted into the through-hole 55b formed in the flat surface portion 55w1 of the front side plate 55. As a result, a position of the front side plate 55 with respect to the middle stay 54 is determined. In addition, the hook portion 54b1 of the protrusion portion 54b faces an upper portion of the through-hole 55a in the front side plate 55. As a result, the hook portion 54b1 of the middle stay 54 abuts on the flat surface portion 55w1 of the front side plate 55, such that movement of the middle stay 54 with respect to the front side plate 55 in a direction opposite to the insertion direction is restricted and the middle stay 54 is prevented from being separated.

Figure 19A:
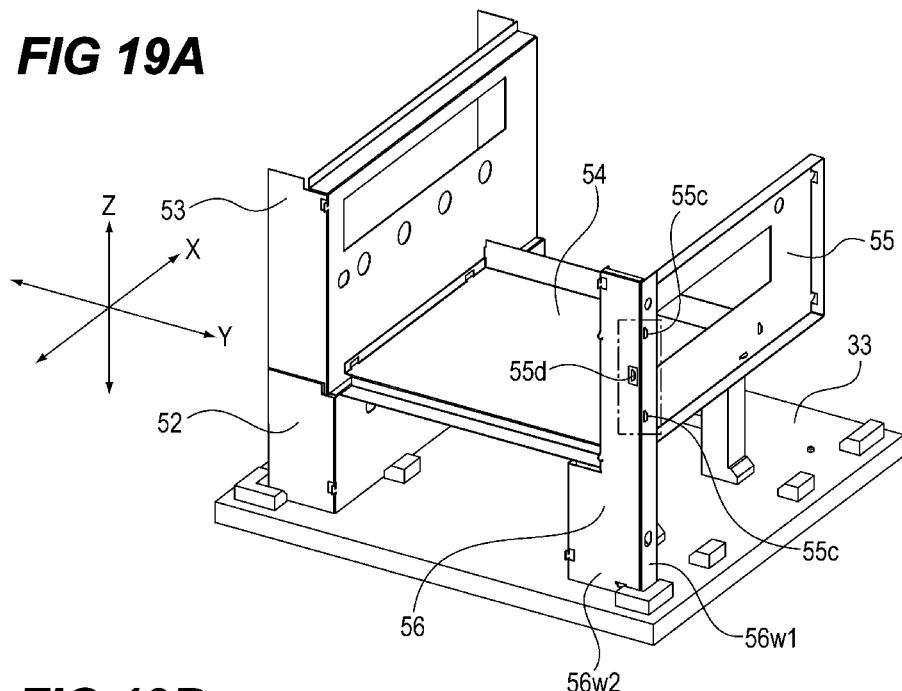
FIGS. 19A and 19B are perspective views when a left support column is assembled.
Figure 19B:
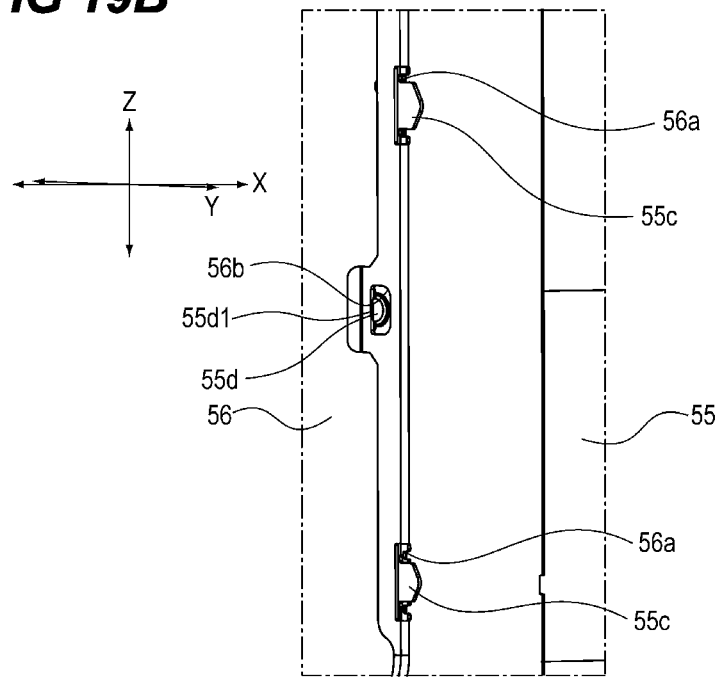

Next, as illustrated in FIGS. 19A and 19B, the left support column 56 is assembled. The left support column 56 is arranged on the stand 33. In addition, the front side plate 55 is inserted into the left support column 56. The left support column 56 is mainly formed of two flat surfaces, and has a flat surface portion 56w1 extending in parallel with the flat surface portion 55w1 of the front side plate 55 and a flat surface portion 56w2 bent substantially vertically from the flat surface portion 56w1 rearward of the image forming apparatus A. A through-hole 56a penetrating in the arrow Y direction is provided at the bent portion of the boundary between the flat surface portion 56w1 and the flat surface portion 56w2 of the left support column 56. In addition, the flat surface portion 56w2 of the left support column 56 is provided with a through-hole 56b penetrating the flat surface portion 56w2 in a plate thickness direction (arrow X direction) of the flat surface portion 56w2. In addition, the bent and raised portion 55w2 of the front side plate 55 is provided with protrusion portions 55c protruding in an insertion direction (arrow Y direction) into the left support column 56 and a projection portion 55d protruding in a plate thickness direction (arrow X direction).

The protrusion portion 55c of the front side plate 55 is inserted into the through-hole 56a formed in the left support column 56. As a result, a position of the left support column 56 with respect to the front side plate 55 is determined. In addition, the projection portion 55d of the front side plate 55 engages with the through-hole 56b of the left support column 56. As a result, an edge portion 55d1 of the projection portion 55d abuts on an inner wall of the through-hole 56b, such that movement of the front side plate 55 with respect to the left support column 56 in a direction opposite to the insertion direction is restricted.

Figure 20A:
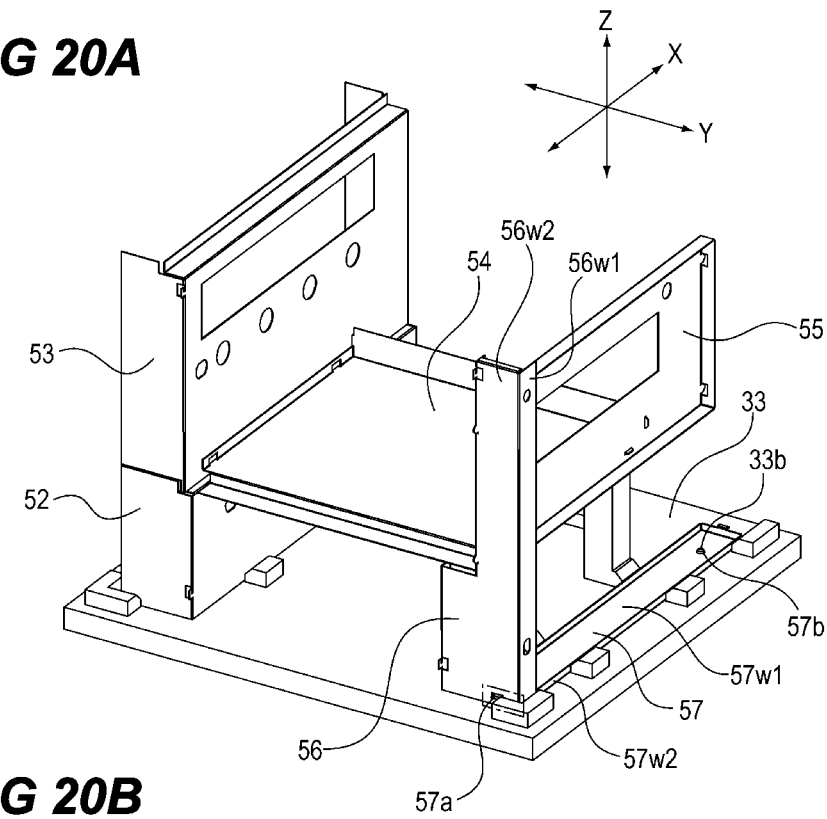
FIGS. 20A and 20B are perspective views when a front lower stay is assembled.
Figure 20B:
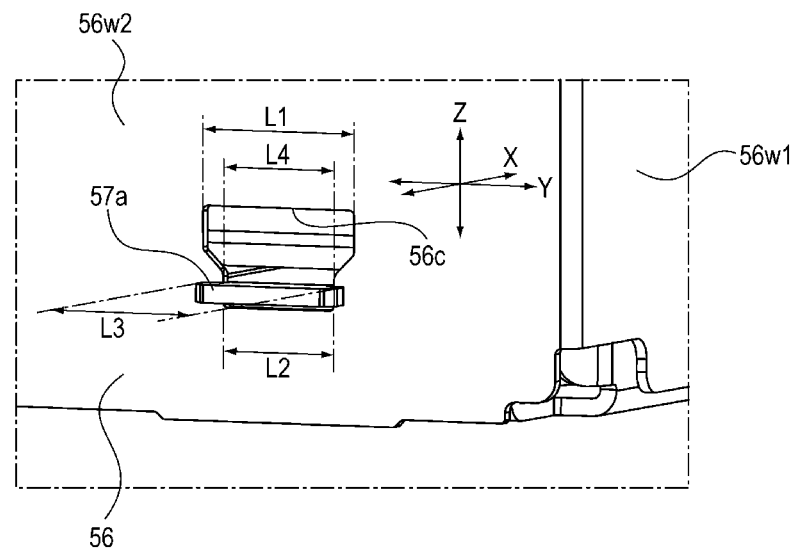

Next, as illustrated in FIGS. 20A and 20B, the front lower stay 57 is assembled. The front lower stay 57 is arranged on the stand 33, and is inserted and assembled into the left support column 56. The front lower stay 57 has a flat surface portion 57w1, which is a flat surface to be placed on the stand 33, and a bent and raised portion 57w2 formed by bending and raising each of both end portions of the flat surface portion 57w1 in the arrow X direction and the arrow Y direction substantially vertically and upward from the flat surface portion 57w1. The bent and raised portion 57w2 of the front lower stay 57 is provided with a protrusion portion 57a protruding in an insertion direction (arrow X direction) into the left support column 56. Positioning holes 57b penetrating the flat surface portion 57w1 in a plate thickness direction (arrow Z direction) of the flat surface portion 57w1 are formed in the flat surface portion 57w1 of the front lower stay 57. In addition, the flat surface portion 56w2 of the left support column 56 is provided with a through-hole 56c penetrating the flat surface portion 56w2 in a plate thickness direction (arrow X direction) of the flat surface portion 56w2. Here, the width of the upper end portion of the through-hole 56c is L1 and the width of the lower end portion is L2. In addition, the width of the tip portion of the protrusion portion 57a is L3, and the width of the substrate portion is L4. At this time, the relationship is L1>L2, L4<L3, L1≈L3, and L2≈L4.

The protrusion portion 57a of the front lower stay 57 is inserted into and engaged with a through-hole 56c formed in the flat surface portion 56w2 of the left support column 56. At this time, the protrusion portion 57a is inserted from an upper side of the through-hole 56c, and then moved to the lower end portion of the through-hole 56c by the force or gravity of an assembly operator. Here, when the protrusion portion 57a is located at a lower end portion of the through-hole 56c, movement of the protrusion portion 57a with respect to the through-hole 56c in a direction opposite to the insertion direction is restricted by the relationship of L3>L2. In addition, when the front lower stay 57 is arranged on the stand 33, the positioning pins 33b of the stand 33 are inserted into the positioning holes 57b of the front lower stay 57. As a result, a position of the front lower stay 57 with respect to the stand 33 is determined.

Figure 21:
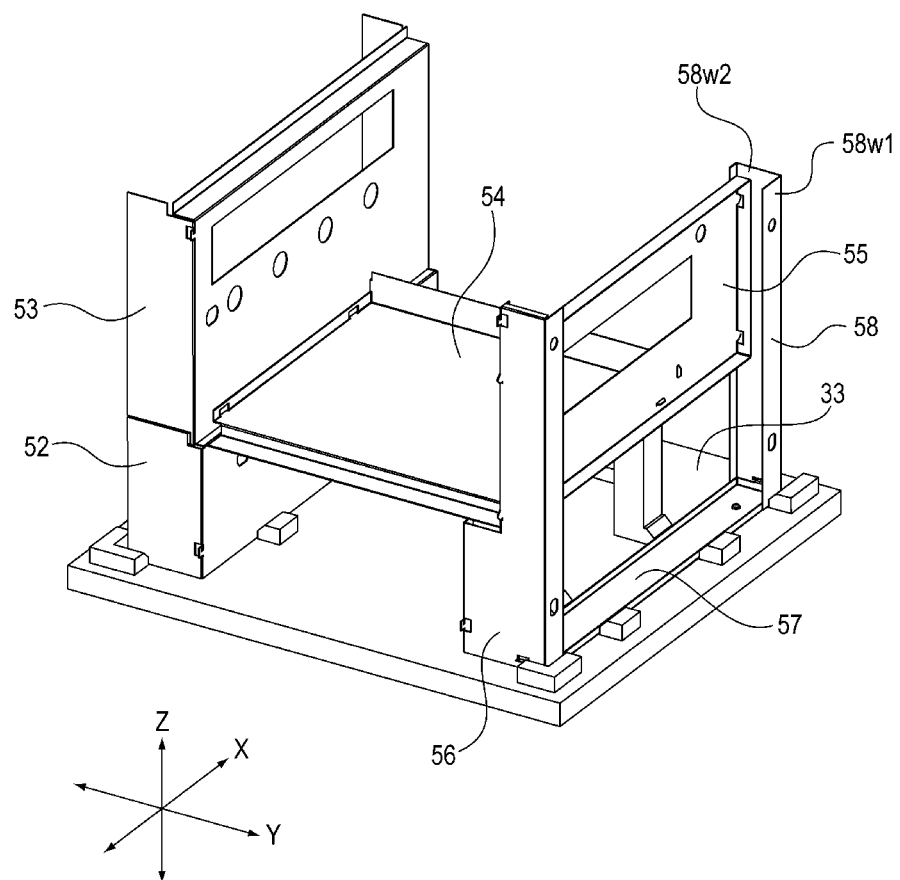
FIG. 21 is a perspective view when a right support column is assembled.

Next, as illustrated in FIG. 21, the right support column 58 is assembled. The right support column 58 is arranged on the stand 33. In addition, the front side plate 55 is inserted and assembled into the right support column 58. The right support column 58 has a flat surface portion 58w1 extending in parallel with the flat surface portion 55w1 of the front side plate 55 and a flat surface portion 58w2 bent substantially vertically from the flat surface portion 58w1 forward of the image forming apparatus A. An assembly configuration of the right support column 58 and the front side plate 55 is similar to that of the left support column 56 and the front side plate 55. That is, a through-hole (not illustrated) penetrating a bent portion of a boundary between the flat surface portion 58w1 and the flat surface portion 58w2 of the right support column 58 in the arrow Y direction is formed in the bend portion. A protrusion portion (not illustrated) formed in the bent and raised portion 55w2 of the front side plate 55 and protruding in an insertion direction (arrow Y direction) into the right support column 58 is inserted into this through-hole. In addition, the flat surface portion 58w2 of the right support column 58 is provided with a through-hole (not illustrated) penetrating the flat surface portion 58w2 in a plate thickness direction (arrow X direction) of the flat surface portion 58w2. A projection portion (not illustrated) formed in the bent and raised portion 55w2 of the front side plate 55 and protruding in the arrow X direction engages with this through-hole. Here, the left support column 56 and the right support column 58 are assembled after assembling the front side plate 55 to the middle stay 54, but the front side plate 55 is attached to the middle stay 54 with the left support column 56 mounted on the stand 33 in the order of assembling to the left support column 56.

At a point in time when the frame 31 is assembled up to now, the frame 31 can stand for oneself. That is, the frame 31 can stand for oneself by assembling the front side plate 55, the right support column 58, the left support column 56, the front lower stay 57, which are the frame 31 on the front surface side of the image forming apparatus A, the rear bottom plate 51 and the rear side plates 52 and 53, which are the frame on the rear surface side of the image forming apparatus A, and the middle stay 54, which is the frame 31 connecting the frame on the front surface side and the frame on the rear surface side to each other, to each other.

Figure 22A:
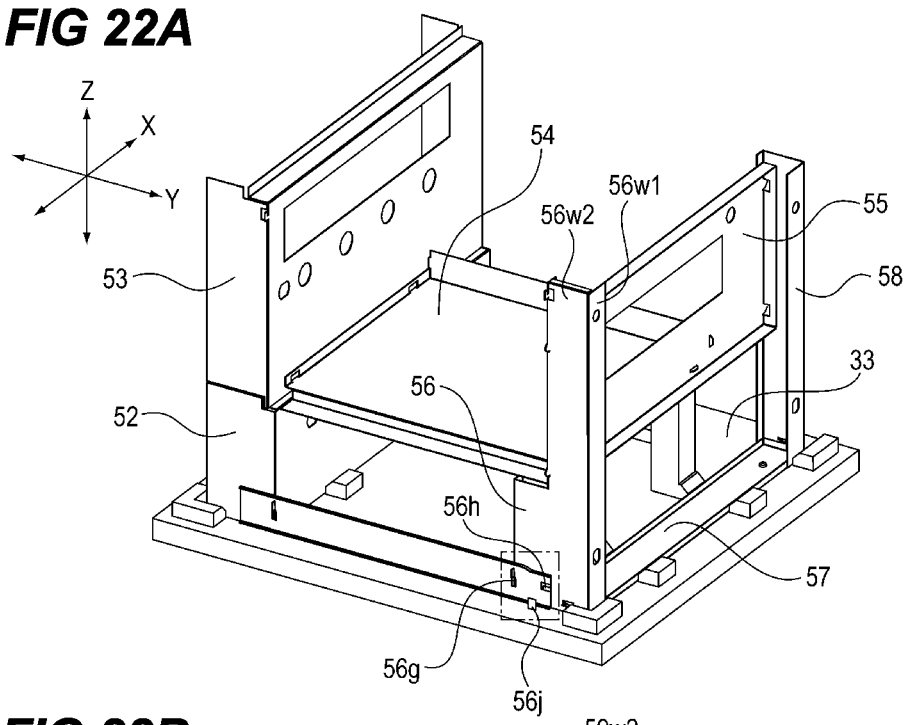
FIGS. 22A and 22B are perspective views when a left lower stay is assembled.
Figure 22B:
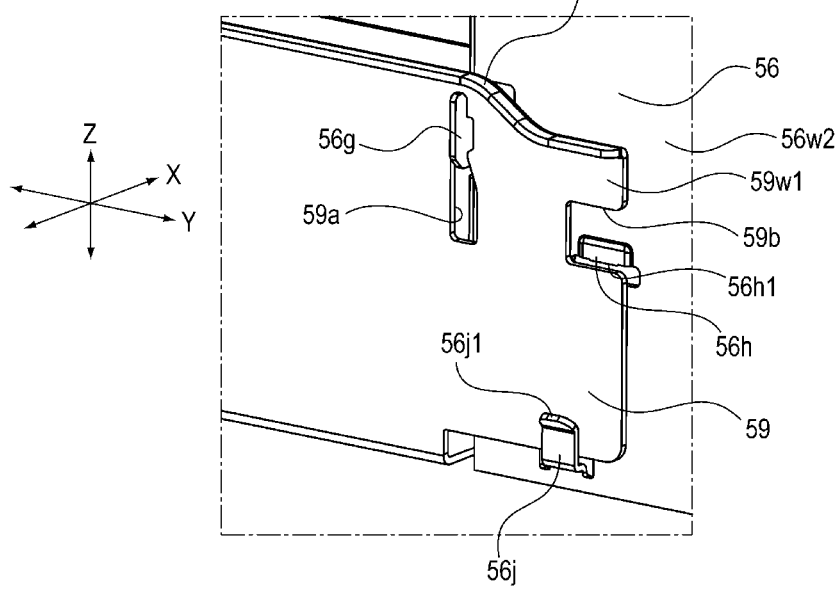

Next, as illustrated in FIGS. 22A and 22B, the left lower stay 59 is assembled. The left lower stay 59 has a flat surface portion 59w1 extending in parallel with the flat surface portion 56w2 of the left support column 56, and a bent and raised portion 59w2 bent in the plate thickness direction (arrow X direction) of the flat surface portion 59w1 at the upper part of the flat surface portion 59w1. The left lower stay 59, and the rear side plate 52 and the left support column 56 are inserted and assembled into each other from the vertical direction. An assembly configuration of the left lower stay 59 and the left support column 56 and an assembly configuration of the left lower stay 59 and the rear side plate 52 are similar to each other. Therefore, only the assembly configuration of the left lower stay 59 and the left support column 56 will be described here.

The flat surface portion 56w2 of the left support column 56 is provided with a protrusion portion 56g and a step-bent portion 56j that protrude in an insertion direction (arrow Z direction) into the left lower stay 59 and a projection portion 56h that protrudes in a plate thickness direction (arrow X direction) of the flat surface portion 56w2. The step-bent portion 56j has a portion bent in the plate thickness direction of the flat surface portion plate 56w2 and a portion bent and extended from that portion in the insertion direction into the left lower stay 59. In addition, a tip portion of the step-bent portion 56j is an inclined portion 56j1 inclined in a direction away from the flat surface portion 56w2 with respect to the insertion direction of the left support column 56 into the left lower stay 59. In addition, a through-hole 59a penetrating the flat surface portion 59w1 in the plate thickness direction (arrow X direction) of the flat surface portion 59w1 and a notch portion 59b notched in the flat surface direction are formed in the flat surface portion 59w1 of the left lower stay 59.

The protrusion portion 56g of the left support column 56 is inserted into and engaged with the through-hole 59a formed in the flat surface portion 59w1 of the left lower stay 59. Here, the width of the protrusion portion 56g in the arrow Y direction and the width of the through-hole 59a in the arrow Y direction are almost the same. Therefore, the protrusion portion 56g is inserted into the through-hole 59a, such that a position of the left lower stay 59 with respect to the left support column 56 in the arrow Y direction is determined.

In addition, the step-bent portion 56j of the left support column 56 is inserted into and engaged with a lower end portion of the flat surface portion 59w1 of the left lower stay 59. As a result, the flat surface portion 59w1 of the left lower stay 59 is sandwiched from the plate thickness direction (arrow X direction) of the flat surface portion 59w1 by the step-bent portion 56j and the flat surface portion 56w2 in the left support column 56, such that a position of the left lower stay 59 with respect to the left support column 56 in the arrow X direction is determined.

In addition, the projection portion 56h of the left support column 56 engages with the notch portion 59b formed in the left lower stay 59. As a result, an edge portion 56h1 of the projection portion 56h abuts on an inner wall of the notch portion 59b, such that movement of the left support column 56 with respect to the left lower stay 59 in a direction opposite to the insertion direction is restricted.

Figure 23A:
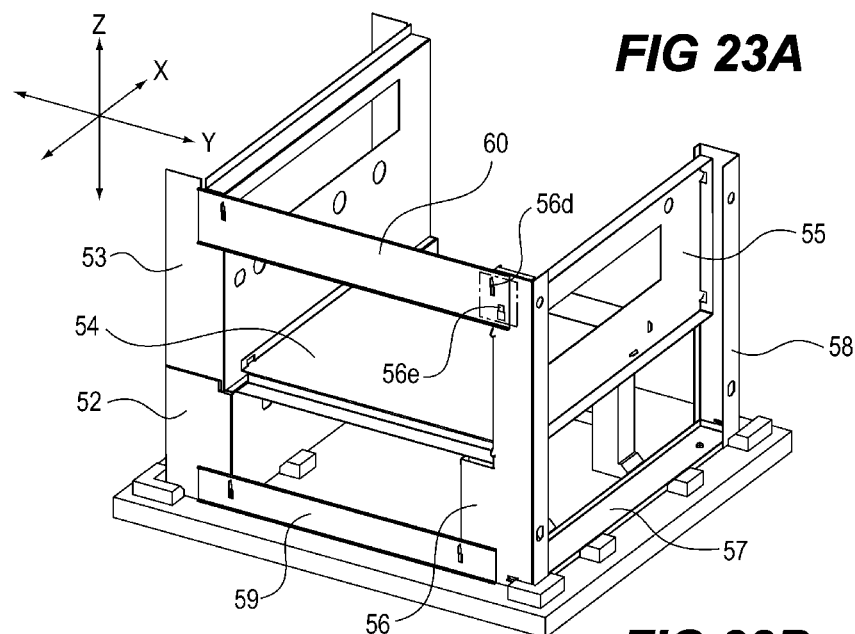
FIGS. 23A and 23B are perspective views when a left upper stay is assembled.
Figure 23B:
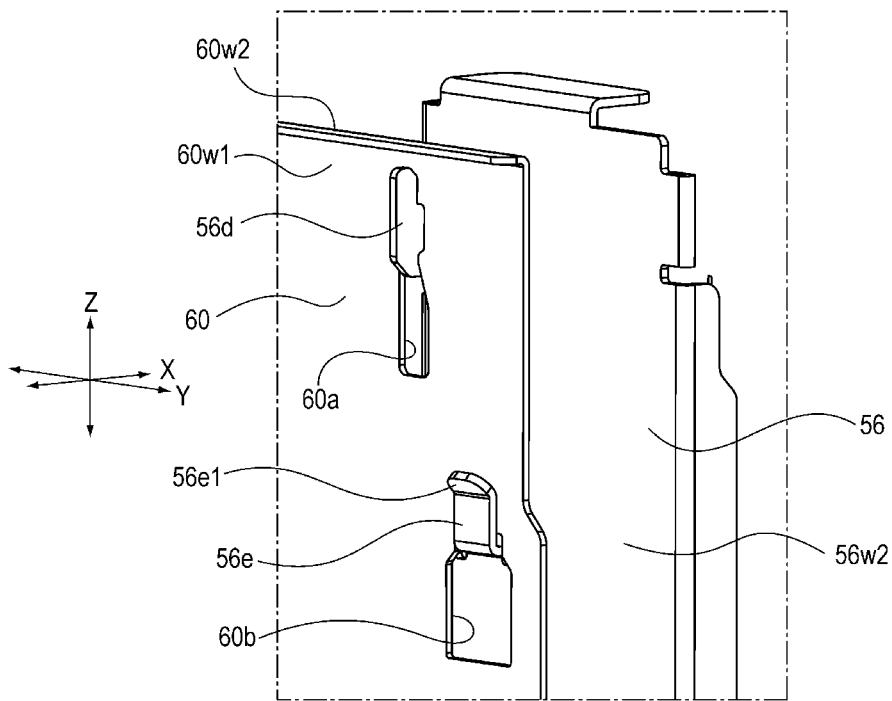

Next, as illustrated in FIGS. 23A and 23B, the left upper stay 60 is assembled. The left lower stay 59, and the rear side plate 53 and the left support column 56 are inserted and assembled into each other from the vertical direction. An assembly configuration of the left upper stay 60 and the rear side plate 53 and an assembly configuration of the left upper stay 60 and the left support column 56 are similar to each other. Therefore, only the assembly configuration of the left upper stay 60 and the left support column 56 will be described here.

A protrusion portion 56d and a step-bent portion 56e that protrude in an insertion direction (arrow Z direction) into the left upper stay 60 are formed in the flat surface portion 56w2 of the left support column 56. The step-bent portion 56e has a portion bent in the plate thickness direction (arrow X direction) of the flat surface portion plate 56w2 of the left support column 56 and a portion bent and extended from that portion in the insertion direction into the left upper stay 60. In addition, a tip portion of the step-bent portion 56e is an inclined portion 56e1 inclined in a direction away from the flat surface portion 56w2 with respect to the insertion direction of the left support column 56 into the left upper stay 60.

The left upper stay 60 has a flat surface portion 60w1 extending in parallel with the flat surface portion 56w2 of the left support column 56, and a bent and raised portion 60w2 bent in the plate thickness direction (arrow X direction) of the flat surface portion 60w1 at the upper part of the flat surface portion 60w1. Through-hole 60a and 60b penetrating the flat surface portion 60w1 in the plate thickness direction (arrow X direction) thereof is formed in the flat surface portion 60w1 of the left upper stay 60.

The protrusion portion 56d of the left support column 56 is inserted into and engaged with the through-hole 60a formed in the flat surface portion 60w1 of the left upper stay 60. Here, the width of the protrusion portion 56d in the arrow Y direction and the width of the through-hole 60a in the arrow Y direction are almost the same. Therefore, the protrusion portion 56d is inserted into the through-hole 60a, such that a position of the left upper stay 60 with respect to the left support column 56 in the arrow Y direction is determined. In addition, the step-bent portion 56e of the left support column 56 is inserted into and engaged with the through-hole 60b of the left upper stay 60. As a result, the flat surface portion 60w1 of the left upper stay 60 is sandwiched from the plate thickness direction (arrow X direction) of the flat surface portion 60w1 by the step-bent portion 56e and the flat surface portion 56w2 in the left support column 56, such that a position of the left upper stay 60 with respect to the left support column 56 in the arrow X direction is determined.

Figure 24:
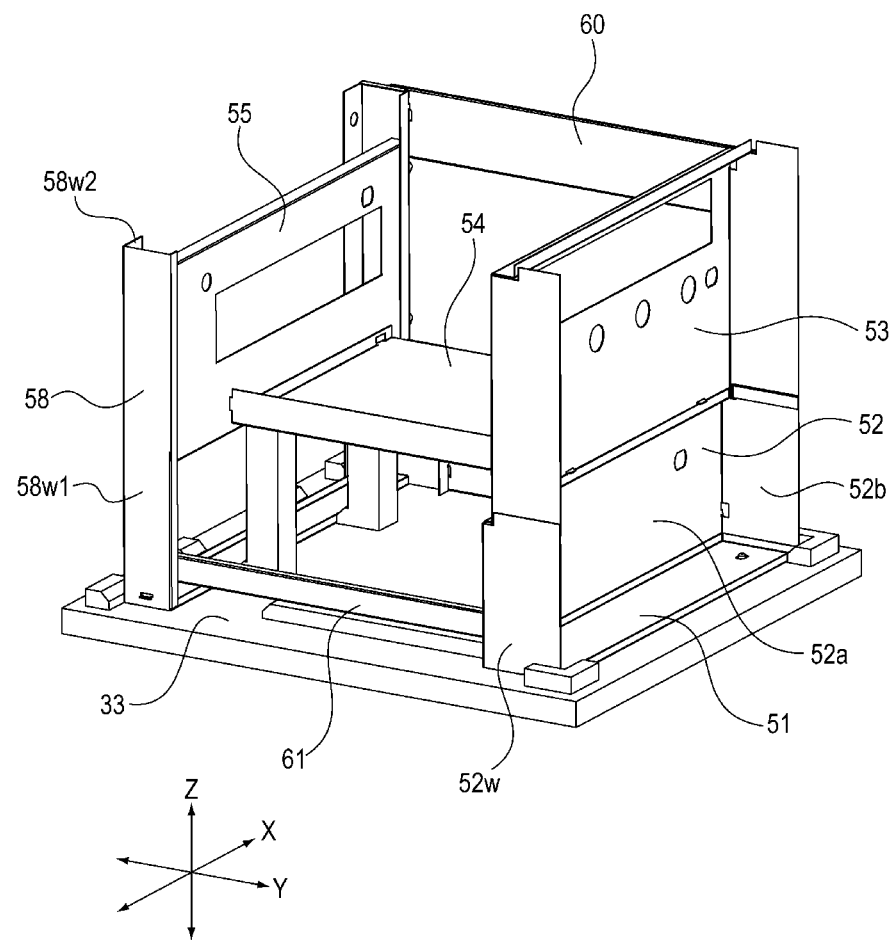
FIG. 24 is a perspective view when a right lower stay is assembled.

Next, as illustrated in FIG. 24, the right lower stay 61 is assembled. The right lower stay 61 is a member connecting between the rear side plate 52 and the right support column 58 facing each other, and is inserted and assembled into the rear side plate 52 and the right support column 58 from a front side where the right support column 58 is located, in the horizontal direction (arrow Y direction). The right lower stay 61 is a member connected to the right support column 58 and the rear side plate 52 so that an interval between the right support column 58 and the rear side plate 52 becomes a predetermined interval, and guaranteeing a conveyance property of the sheet S. In addition, since the right lower stay 61 is located in the vicinity of a right lower corner of the frame 31, the right lower stay 61 has an influence on rigidity of the frame 31. Therefore, it is particularly desirable that the right lower stay 61 is assembled with high position accuracy. Hereinafter, an assembly configuration of the right lower stay 61 will be described in detail.

FIGS. 25A and 25B are perspective views of the right lower stay 61, the rear side plate 52, and the right support column 58. Here, FIG. 25A illustrates a state before the right lower stay 61 is assembled, and FIG. 25B illustrates a state where the right lower stay 61 is assembled. First, an assembly configuration of the right lower stay 61 and the rear side plate 52 will be described. As illustrated in FIGS. 25A and 25B, the flat surface portion 52a of the rear side plate 52 is provided with a bent portion 250 bent and raised toward the front surface side in the arrow Y direction. The bent portion 250 is bent and raised in a plate thickness direction of the flat surface portion 52a of the rear side plate 52, and is bent and raised in a direction opposite to the bent portion 52w with respect to the flat surface portion 52a. In addition, a through-hole 251 penetrating through the flat surface portion 52a in the plate thickness direction (arrow Y direction) of the flat surface portion 52a is formed around the bent portion 250, in the flat surface portion 52a of the rear side plate 52. As described above, the rear side plate 52 is formed of one metal plate, and the through-hole 251 is a hole formed when the bent portion 250 is processed.

The right lower stay 61 includes three flat surfaces and has a U-shaped cross section. The right lower stay 61 has a flat surface portion 61w1 extending substantially in parallel with the bent portion 52w of the rear side plate 52 and a flat surface portion 61w2 bent substantially vertically from the flat surface portion 61w1 in the arrow X direction at an upper portion of the flat surface portion 61w1. In addition, the right lower stay 61 has a flat surface portion 61w3 bent so as to face the flat surface portion 61w2 at a lower portion of the flat surface portion 61w1. The flat surface portion 61w1 of the right lower stay 61 is provided with a step-bent portion 61a inserted into and engaged with the bent portion 250 of the rear side plate 52. The step-bent portion 61a has a portion bent in the plate thickness direction (arrow X direction) of the flat surface portion 61w1 of the right lower stay 61 and a portion bent and extended from that portion in the insertion direction (arrow Y direction) into the rear side plate 52. The step-bent portion 61a is formed by forming a through-hole around the step-bent portion 61a at the time of being processed with respect to the flat surface portion 61w2 and bending the step-bent portion 61a with respect to the flat surface portion 61w2.

When the right lower stay 61 is assembled, the entirety of one end portion of the right lower stay 61 in the arrow Y direction is inserted into the through-hole 251 of the rear side plate 52, and the step-bent portion 61a of the right lower stay 61 is inserted into and engaged with the bent portion 250 of the rear side plate 52. As a result, the bent portion 250 of the rear side plate 52 is sandwiched from the plate thickness direction (arrow X direction) of the bent portion 250 by the step-bent portion 61a and the flat surface portion 61w1 in the right lower stay 61, such that a position of the right lower stay 61 with respect to the rear side plate 52 in the arrow X direction (plate thickness direction of the flat surface portion 61w1) is determined.

In addition, the flat surface portion 61w2, which is an upper surface of the right lower stay 61, and an inner wall of an upper side of the through-hole 251 of the rear side plate 52 face each other with a predetermined interval therebetween, and the flat surface portion 61w3, which is a lower surface of the right lower stay 61, and an inner wall of a lower side of the through-hole 251 of the rear side plate 52 are in contact with each other by a weight of the right lower stay 61. As a result, a position of the right lower stay 61 with respect to the rear side plate 52 in the vertical direction (arrow Z direction) is determined with a backlash corresponding to a predetermined interval.

Next, an assembly configuration of the right lower stay 61 and the right support column 58 will be described. As illustrated in FIGS. 25A and 25B, an insertion hole 58a into which a step-bent portion 61b of the right lower stay 61 is inserted is formed in the flat surface portion 58w2 of the right support column 58. Further, the right support column 58 has a flat surface portion (not illustrated) extending in the arrow Y direction behind the image forming apparatus A from the periphery of the insertion hole 58a in the flat surface portion 58w2. The flat surface portion (not illustrated) is provided with a projection portion (not illustrated) protruding in a plate thickness direction (arrow X direction) of the flat surface portion and having a substantially semi-circular shape. The projection portion (not illustrated) is formed by drawing, and is arranged at a position adjacent to the insertion hole 58a in an insertion direction (arrow Y direction) of the step-bent portion 61b into the insertion hole 58a.

In addition, the flat surface portion 61w1 of the right lower stay 61 is provided with the step-bent portion 61b inserted into and engaged with the insertion hole 58a of the right support column 58. The step-bent portion 61b has a portion bent in the plate thickness direction (arrow X direction) of the flat surface portion 61w1 and a portion bent and extended from that portion in the insertion direction (arrow Y direction) into the right support column 58.

In addition, a through-hole 61c penetrating the flat surface portion 61w1 in the plate thickness direction of the flat surface portion 61w1 is formed around the step-bent portion 61b in the flat surface portion 61w1 of the right lower stay 61. The through-hole 61c is arranged at a position adjacent to the step-bent portion 61b in the insertion direction of the right lower stay 61 into the right support column 58. As described above, the right lower stay 61 is formed of one metal plate, and the through-hole 61c is a hole formed when the step-bent portion 61b is processed.

When the right lower stay 61 is assembled, the step-bent portion 61b of the right lower stay 61 is inserted into and engaged with the insertion hole 58a of the right support column 58, and the projection portion (not illustrated) of the right support column 58 engages with the through-hole 61c of the right lower stay 61. As described above, the step-bent portion 61b engages with the insertion hole 58a, such that a position of the right lower stay 61 with respect to the right support column 58 in the arrow X direction, the arrow Y direction, and the arrow Z direction is determined. In addition, an upper surface of the step-bent portion 61b and an inner wall of an upper side of the insertion hole 58a face each other with a predetermined interval therebetween, and a lower surface of the step-bent portion 61b and an inner wall of a lower side of the insertion hole 58a face each other with a predetermined interval therebetween. As a result, a position of the right lower stay 61 with respect to the right support column 58 in a direction from the rear side toward the front side in the arrow Y direction is determined. With such a configuration, a position of the right lower stay 61 with respect to the right support column 58 in the arrow X direction, the arrow Y direction, and the vertical direction (arrow Z direction) is determined with a backlash corresponding to a predetermined interval.

In addition, in a state where the right lower stay 61 engages with the rear side plate 52 or the right support column 58, the projection portion (not illustrated) of the right support column 58 abuts on the inner wall of the through-hole 61c, such that movement of the right lower stay 61 with respect to the rear side plate 52 and the right support column 58 in a direction opposite to the insertion direction is restricted. The insertion direction of the right lower stay 61 into the rear side plate 52 and the right support column 58 is a direction orthogonal to a flat surface of the flat surface portion 52a of the rear side plate 52, and is a direction from the front side toward the rear side in the arrow Y direction. The opposite direction to the insertion direction of the right lower stay 61 into the rear side plate 52 and the right support column 58 is a direction orthogonal to a flat surface of the flat surface portion 52a of the rear side plate 52, and is a direction from the rear side toward the front side in the arrow Y direction.

Next, as illustrated in FIG. 26, the rear side plate 62 is assembled. The rear side plate 62 is inserted and assembled into the rear side plate 53 from the arrow Z direction. An assembly configuration of the rear side plate 62 and the rear side plate 53 is similar to that of the rear side plate 52 and the rear side plate 53, and is an assembly configuration in which the rear side plate 62 and the rear side plate 53 are inserted into and engaged with each other.

Figure 27A:
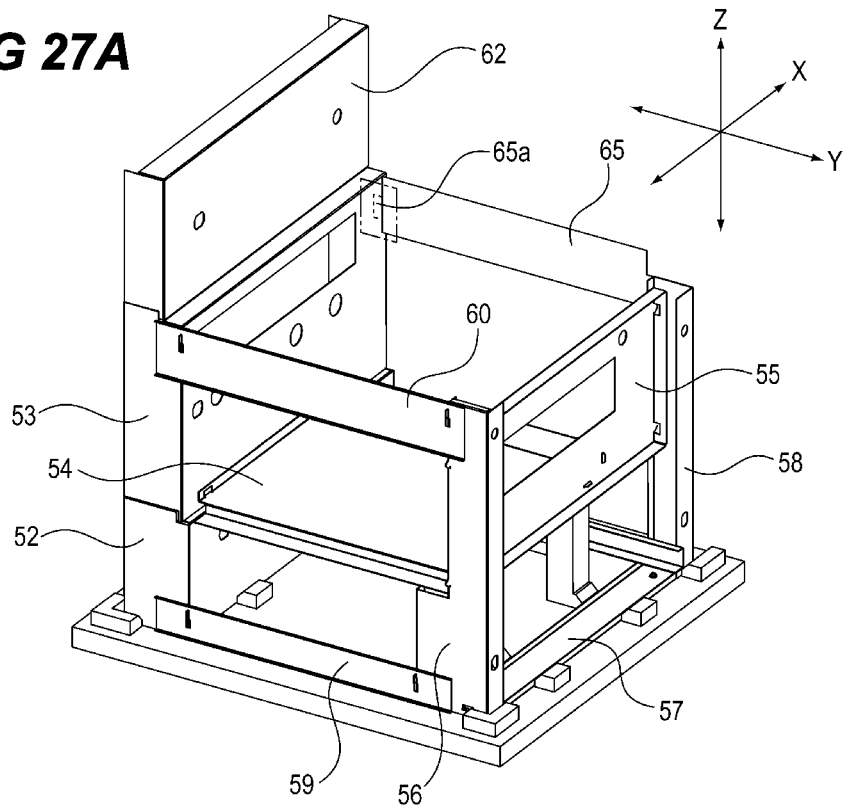
FIGS. 27A and 27B are perspective views when a right middle stay is assembled.
Figure 27B:
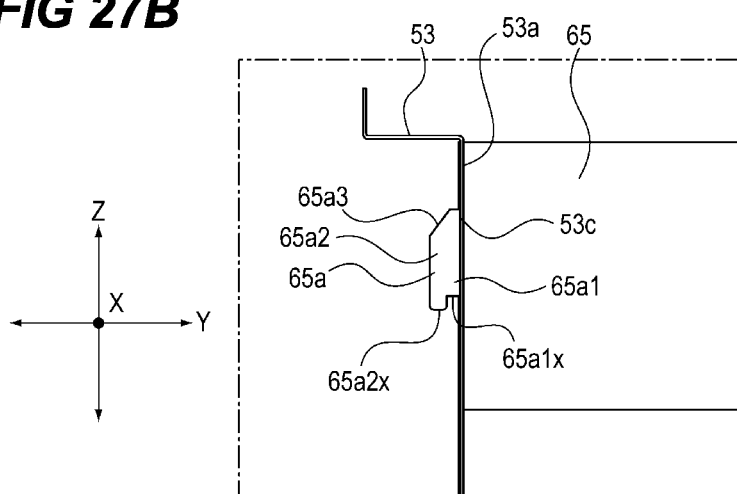

Next, as illustrated in FIGS. 27A and 27B, the right middle stay 65 is assembled. The right middle stay 65 is a plate-shaped member that is formed by one flat surface, and is a member that supports a fan cooling an end portion of the fixing portion 45 in a rotational axis direction. The right middle stay 65 is inserted and assembled into the rear side plate 53 and the right support column 58. An assembly configuration of the right middle stay 65 and the rear side plate 53 and an assembly configuration of the right middle stay 65 and the right support column 58 are similar to each other. Therefore, only the assembly configuration of the right middle stay 65 and the rear side plate 53 will be mainly described here.

A through-hole 53c penetrating the support portion 53a in the plate thickness direction (arrow Y direction) of the support portion 53a is formed in the support portion 53a of the rear side plate 53. Note that the rear side plate 53 is a member extending in the vertical direction. In addition, the right middle stay 65 is provided with a protrusion portion 65a protruding in an insertion direction (arrow Y direction) into the support portion 53a of the rear side plate 53 and inserted into the through-hole 53c of the rear side plate 53 from the arrow Y direction.

The protrusion portion 65a is provided at a base portion 65a1 that fits into the through-hole 53c and a tip side in the insertion direction from the base 65a1, and has a hook portion 65a2 in which the lower end portion 65a2x is located at a position vertically lower than the lower end portion 65a1x of the base portion 65a1. In addition, the protrusion portion 65a has an inclined portion 65a3 inclined so that a height decreases from an upper end portion of the base portion 65a1 to an upper end portion of the hook portion 65a2.

When the protrusion portion 65a is inserted into the through-hole 53c, the hook portion 65a2, which is a tip portion of the protrusion portion 65a, is first inserted, the base portion 65a1 is inserted, and the base portion 65a1 is then fitted into the through-hole 53c. A width of the base portion 65a1 of the protrusion portion 65a in the vertical direction and a width of the through-hole 53c in the vertical direction are substantially the same as each other. In addition, a plate thickness of the right middle stay 65 and a width of the through-hole 53c in the arrow X direction are substantially the same as each other. Therefore, the base portion 65a1 of the protrusion portion 65a is fitted into the through-hole 53c, such that a position of the right middle stay 65 with respect to the rear side plate 53 in the vertical direction (arrow Z direction) and a position of the right middle stay with respect to the rear side plate in a direction (arrow X direction) orthogonal to the insertion direction and the vertical direction are determined.

Further, in the state in which the base portion 65a1 of the protrusion portion 65a is fitted into the through-hole 53c, a lower end portion 65a2x of the hooking portion 65a2 is located at a position facing the portion below the through-hole 53c in the support portion 53a of the rear side plate 53. In the present embodiment, the lower end portion 65a2x of the hook portion 65a2 protrudes 2 mm downward with respect to the lower end portion 65a1x of the base portion 65a1 and is provided so as to be spaced by 3 mm from the facing portion of the right middle stay facing the support portion 53a of the rear side plate 53. Here, the plate thickness of the support portion 53a of the rear side plate 53 is about 1 mm, and the length of the base portion 65a1 of the protrusion portion 65a in the arrow Y direction is longer than the plate thickness of the support portion 53a of the rear side plate 53. As a result, even though the rear side plate 53 and the right middle stay 65 are relatively inclined during assembly, the hook portion 65a2 is hooked on the support portion 53a, such that movement of the right middle stay 65 with respect to the support portion 53a of the rear side plate 53 in a direction opposite to the insertion direction is restricted. Therefore, the right middle stay 65 is prevented from being separated from the rear side plate 53, such that it is possible to assemble the right middle stay 65 and the rear side plate 53 to each other with high position accuracy. In addition, since the assembly configuration of the right middle stay 65 and the rear side plate 53 and the assembly configuration of the right middle stay 65 and the right support column 58 are the same as each other as described above, the right middle stay 65 is prevented from being separated from the right support column 58, such that it is possible to improve position accuracy of the right middle stay 65 and the right support column 58.

Figure 28:
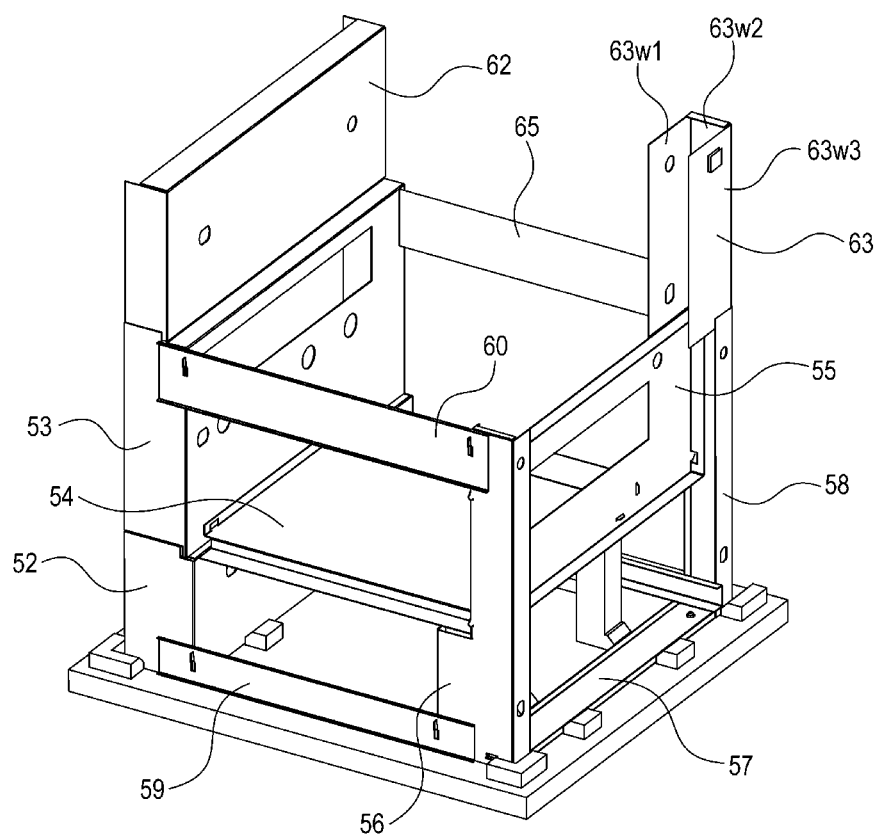
FIG. 28 is a perspective view when a right support column is assembled.

Next, as illustrated in FIG. 28, the right support column 63 is assembled. The right support column 63 faces the flat surface portion 63w1 extending parallel to the flat surface portion 55w1 of the front side plate 55, the flat surface portion 63w2 bent substantially perpendicular to the arrow Y direction from the flat surface portion 63w1, and a flat surface portion 63w3 bent substantially vertically so as to face the flat surface portion 63w1 from the flat surface portion 63w2. The right support column 63 and the right support column 58 are inserted and assembled into each other.

Figure 29A:
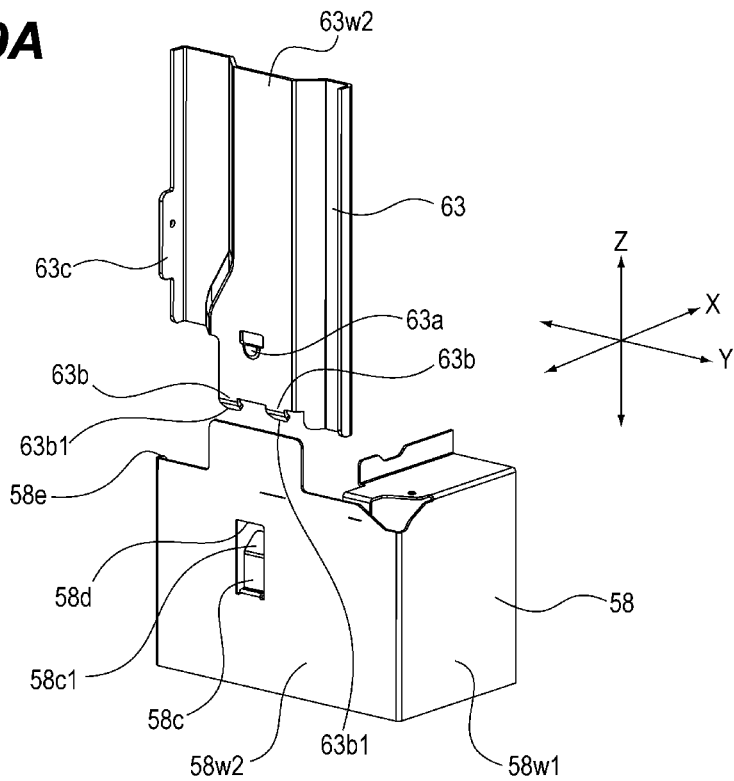
FIGS. 29A and 29B are enlarged perspective views of an engaging portion between the right support column and the right support column.
Figure 29B:
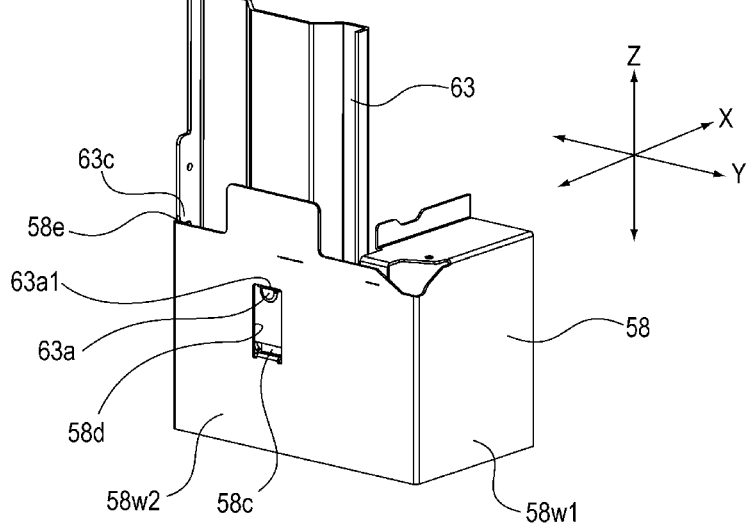

FIGS. 29A and 29B are enlarged perspective views of an engaging portion between the right support column 63 and the right support column 58. Here, FIG. 29A illustrates a state before the right support column 63 and the right support column 58 are assembled to each other, and FIG. 29B illustrates a state where the right support column 63 and the right support column 58 are assembled to each other.

As illustrated in FIGS. 29A and 29B, the flat surface portion 63w2 of the right support column 63 is provided with a projection portion 63a protruding in a plate thickness direction (arrow X direction) of the flat surface portion 63w2 and two protrusion portions 63b protruding in an insertion direction (arrow Z direction) into the right support column 58. Here, the protrusion portion 63b is provided below the projection portion 63a in the vertical direction (arrow Z direction). The projection portion 63a is formed by drawing, and the amount of protrusion from the surface of the flat surface portion 63w2 is about 0.3 mm to 2 mm. In addition, a tip portion of the protrusion portion 63b is an inclined portion 63b1 inclined in a direction away from the flat surface portion 63w2 with respect to the insertion direction of the right support column 63 into the right support column 58.

The flat surface portion 58w2 of the right support column 58 is provided with a step-bent portion 58c protruding in an insertion direction (arrow Z direction) of the right support column 58 into the right support column 63. In addition, a through-hole 58d penetrating the flat surface portion 58w2 in a plate thickness direction (arrow X direction) of the flat surface portion 58w2 is formed at a position adjacent to the step-bent portion 58c in the insertion direction of the right support column 58 with respect to the right support column 63. The step-bent portion 58c has a portion bent in the plate thickness direction of the flat surface portion 58w2 and a portion bent and extended from that portion in the insertion direction into the right support column 63. In addition, a tip portion of the step-bent portion 58c is an inclined portion 58c1 inclined in a direction away from the flat surface portion 58w2 with respect to the insertion direction of the right support column 58 into the right support column 63.

When the right support column 63 is assembled to the right support column 58, the inclined portion 58c1 of the step-bent portion 58c of the right support column 58 abuts on the flat surface portion 63w2 of the right support column 63, and the inclined portion 63b1 of the protrusion portion 63b of the right support column 63 abuts on the flat surface portion 58w2 of the right support column 58. As a result, movement of the right support column 63 and the right support column 58 in the arrow Z direction is guided, and the flat surface portion 63w2 and the flat surface portion 58w2 move in a predetermined positional relationship. In addition, a lower end portion of a stopper portion 63c of the right support column 63 butts a butting portion 58e, which is an upper end portion of the flat surface portion 58w2 of the right support column 58, such that movement of the right support column 63 with respect to the right support column 58 in the insertion direction (arrow Z direction) is restricted.

When the right support column 63 is assembled to the right support column 58, the step-bent portion 58c of the right support column 58 is inserted into the flat surface portion 63w2 of the right support column 63 and engages with a lower end portion of the flat surface portion 63w2. As a result, the flat surface portion 63w2 of the right support column 63 is sandwiched from the plate thickness direction (arrow X direction) of the flat surface portion 63w2 by the step-bent portion 58c and the flat surface portion 58w2 in the right support column 58, such that a position of the right support column 63 with respect to the right support column 58 in the arrow X direction is determined.

In addition, the projection portion 63a of the right support column 63 engages with the through-hole 58d formed in the right support column 58. As a result, an edge portion 63a1 of the projection portion 63a abuts on an inner wall of the through-hole 58d, such that movement of the right support column 58 with respect to the right support column 63 in a direction opposite to the insertion direction is restricted. Here, the through-hole 58d is arranged at a position adjacent to the step-bent portion 58c in the insertion direction of the right support column 58 into the right support column 63. Therefore, the projection portion 63a engaged with the through-hole 58d and the step-bent portion 58c are arranged at positions adjacent to each other in the insertion direction.

A configuration in which the edge portion 63a1 of the projection portion 63a abuts on the inner wall of the through-hole 58d formed when the step-bent portion 58c is processed has been described in the present embodiment, but a configuration in which the edge portion 63a1 of the projection portion 63a abuts on an inner wall of another through-hole different from the through-hole 58d may be adopted. As a result, the movement of the right support column 63 with respect to the right support column 58 in the direction opposite to the insertion direction is restricted.

In addition, in a direction (arrow Y direction) orthogonal to the plate thickness direction of the flat surface portion 63w2 and the insertion direction into the right support column 58, the two protrusion portions 63b of the right support column 63 engage with the step-bent portion 58c so as to sandwich the step-bent portion 58c of the right support column 58 therebetween. As a result, a position of the right support column 63 with respect to the right support column 58 in the orthogonal direction is determined.

As described above, the projection portion 63a restricting the movement of the right support column 63 with respect to the right support column 58 in the direction opposite to the insertion direction is provided in the vicinity of the step-bent portion 58c engaging the flat surface portion 63w2 of the right support column 63 and the flat surface portion 58w2 of the right support column 58 with each other. As a result, it is possible to prevent the right support column 63 from moving with respect to the right support column 58 in the direction opposite to the insertion direction, such that the right support column 63 and the right support column 58 are separated from each other, resulting in deterioration of position accuracy. Therefore, the right support column 63 and the right support column 58 that constitute the frame 31 can be assembled to each other with high position accuracy.

Figure 30A:
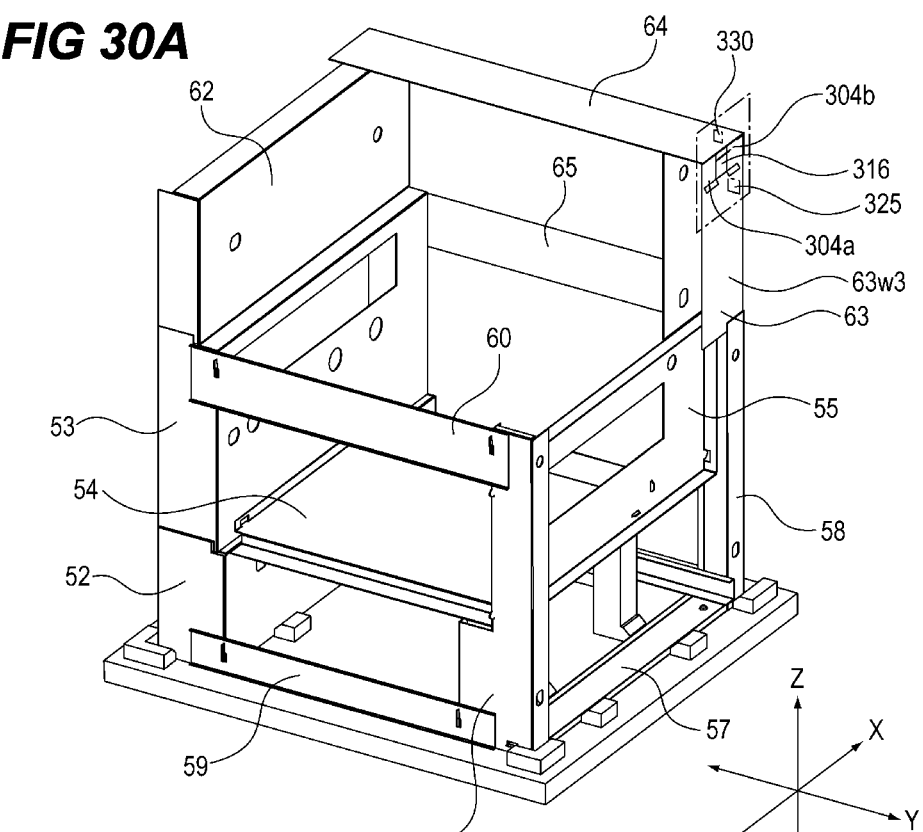
FIGS. 30A and 30B are perspective views when a right upper stay is assembled.
Figure 30B:
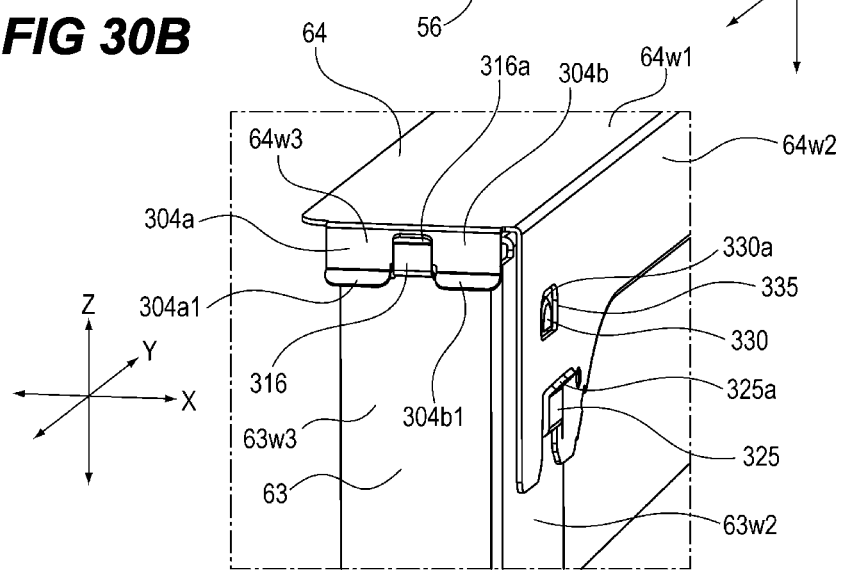

Next, as illustrated in FIGS. 30A and 30B, the right upper stay 64 is assembled. The right upper stay 64 has a flat surface portion 64w1 extending in the horizontal direction, a flat surface portion 64w2 formed by bending one end portion of the flat surface portion 64w1 in the arrow X direction substantially vertically in the vertical direction, and a flat surface portion 64w3 formed by bending one end portion of the flat surface portion 64w1 in the arrow Y direction substantially vertically in the vertical direction. In addition, the right upper stay 64 has a flat surface portion (not illustrated) formed by bending the other end portion of the flat surface portion 64w1 in the arrow Y direction substantially vertically in the vertical direction. The right upper stay 64, and the rear side plate 62 and the right support column 63 are inserted and assembled into with each other. An assembly configuration of the right upper stay 64 and the rear side plate 62 and an assembly configuration of the right upper stay 64 and the right support column 63 are similar to each other. Therefore, only the assembly configuration of the right upper stay 64 and the right support column 63 will be described here.

The flat surface portion 64w3 of the right upper stay 64 includes three bent portions 304a, 304b, and 304c bent from the flat surface portion 64w1 in an insertion direction (arrow Z direction) into the right support column 63. That is, when the flat surface portion 64w3 is divided into three portions in the arrow X direction, there are the bent portions 304a, 304b, and 304c. The bent portion 304c is arranged at a position between the bent portion 304a and the bent portion 304b in the arrow X direction, and a length of the bent portion 304c in the arrow Z direction is smaller than that of the bent portions 304a and 304b in the arrow Z direction. In addition, the bent portions 304a and 304b have the same length in the arrow Z direction, and tip portions of the bent portions 304a and 304b are inclined portions 304a1 and 304b1 inclined in a direction away from the flat surface portion 64w1 with respect to the insertion direction into the right support column 63.

In addition, the flat surface portion 63w3 of the right support column 63 is provided with a step-bent portion 316 protruding in an insertion direction (vertical direction and arrow Z direction) into the right upper stay 64 and inserted into and engaged with the right upper stay 64 so as to overlap with the bent portion 304c of the right upper stay 64 in a plate thickness direction (arrow Y direction) of the flat surface portion 63w3. In addition, the flat surface portion 63w2 of the right support column 63 is provided with a step-bent portion 325 protruding in the insertion direction into the right upper stay 64 and inserted into and engaged with the flat surface portion 64w2 so as to overlap with the flat surface portion 64w2 of the right upper stay 64 in a plate thickness direction (arrow X direction) of the flat surface portion 63w2. In addition, the flat surface portion 63w2 of the right support column 63 is provided with a projection portion 330 penetrating the flat surface portion 63w2 in a plate thickness direction (arrow X direction) of the flat surface portion 63w2.

The step-bent portion 316 has a portion bent in the plate thickness direction (arrow Y direction) of the flat surface portion 63w3 of the right support column 63 and a portion bent and extended from that portion in the insertion direction (arrow Z direction) into the right upper stay 64. In addition, a tip portion of the step-bent portion 316 is an inclined portion 316a formed by further bending a portion of the step-bent portion 316 bent in the insertion direction into the right upper stay 64 and inclined in a direction away from the flat surface portion 63w3 with respect to the insertion direction into the right upper stay 64.

The step-bent portion 325 has a portion bent in the plate thickness direction (arrow X direction) of the flat surface portion 63w2 of the right support column 63 and a portion bent and extended from that portion in the insertion direction (arrow Z direction) into the right upper stay 64. In addition, a tip portion of the step-bent portion 325 is an inclined portion 325a formed by further bending a portion of the step-bent portion 325 bent in the insertion direction into the right upper stay 64 and inclined in a direction away from the flat surface portion 63w2 with respect to the insertion direction into the right upper stay 64.

When the right upper stay 64 is assembled to the right support column 63, the inclined portions 316a and 325a of the step-bent portions 316 and 325 of the right support column 63 abut on the right upper stay 64, and the inclined portion 304a1 and 304b1 of the bent portions 304a and 304b of the right upper stay 64 abut on the right support column 63. As a result, movement of the right upper stay 64 and the right support column 63 is guided, such that the right upper stay 64 and the right support column 63 move in a predetermined positional relationship.

When the step-bent portion 316 engages with the bent portion 304c of the right upper stay 64 and the bent portions 304a and 304b engage with the flat surface portion 63w3 of the right support column 63, the step-bent portion 316 and the bent portions 304a and 304b alternately perform engagement in a direction (arrow X direction) orthogonal to the insertion direction of the right support column 63 into the right upper stay 64 and the plate thickness direction. Specifically, the bent portion 304a engages with the flat surface portion 63w3 of the right support column 63 at a position adjacent to the step-bent portion 316 in the arrow X direction. In addition, the bent portion 304b engages with the flat surface portion 63w3 of the right support column 63 on a side opposite to a side where the bent portion 304a is arranged, with respect to the step-bent portion 316, and at a position adjacent to the step-bent portion 316, in the arrow X direction. With such a configuration, the right upper stay 64 and the right support column 63 are firmly engaged with and assembled to each other.

In addition, the projection portion 330 of the right support column 63 engages with a through-hole 335 formed in the flat surface portion 64w2 of the right upper stay 64 and penetrating the flat surface portion 64w2 in a plate thickness direction (arrow X direction) of the flat surface portion 64w2. As a result, an edge portion 330a of the projection portion 330 abuts on an inner wall of the through-hole 335, such that movement of the right upper stay 64 with respect to the right support column 63 in a direction opposite to the insertion direction is restricted.

As described above, the respective metal plates constituting the frame 31 are assembled. The frame 31 assembled in the assembling process as described above is configured to be able to stand for oneself. Therefore, the frame 31 can be detached from the stand 33 by grasping the rear side plate 52, the left support column 56, the right support column 58, and the like, of the frame 31 and lifting the frame 31.

<Joining Process of Frame>

Next, a process of joining the frame 31 assembled in the assembling process described above will be described.

Figure 31:
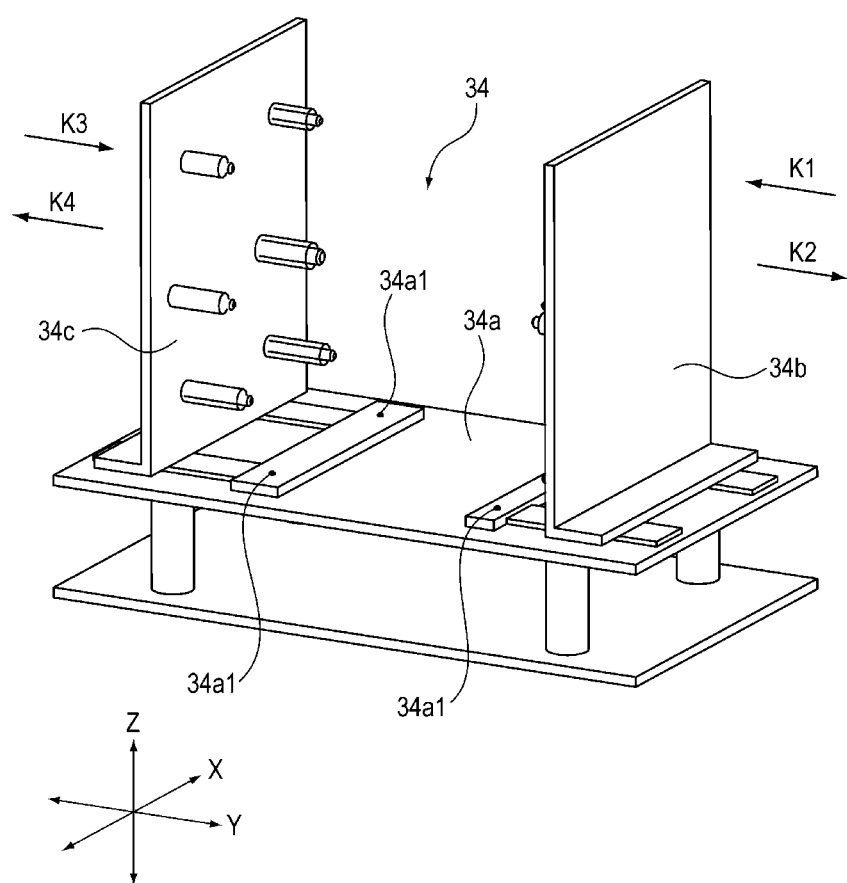
FIG. 31 is a perspective view of a jig used for fixing the frame.

FIG. 31 is a perspective view of a jig 34 used for joining of the frame 31. As illustrated in FIGS. 29A and 29B, the jig 34 has a base 34a, a front side support portion 34b, and a rear side support portion 34c. The base 34a is provided with a positioning pin 34a1. In addition, the front side support portion 34b and the rear side support portion 34c are configured to be slidable with respect to the base 34a. The front side support portion 34b slides in the directions of arrows K1 and K2, and the rear side support portion 34c slides in the directions of arrows K3 and K4.

Figure 32:
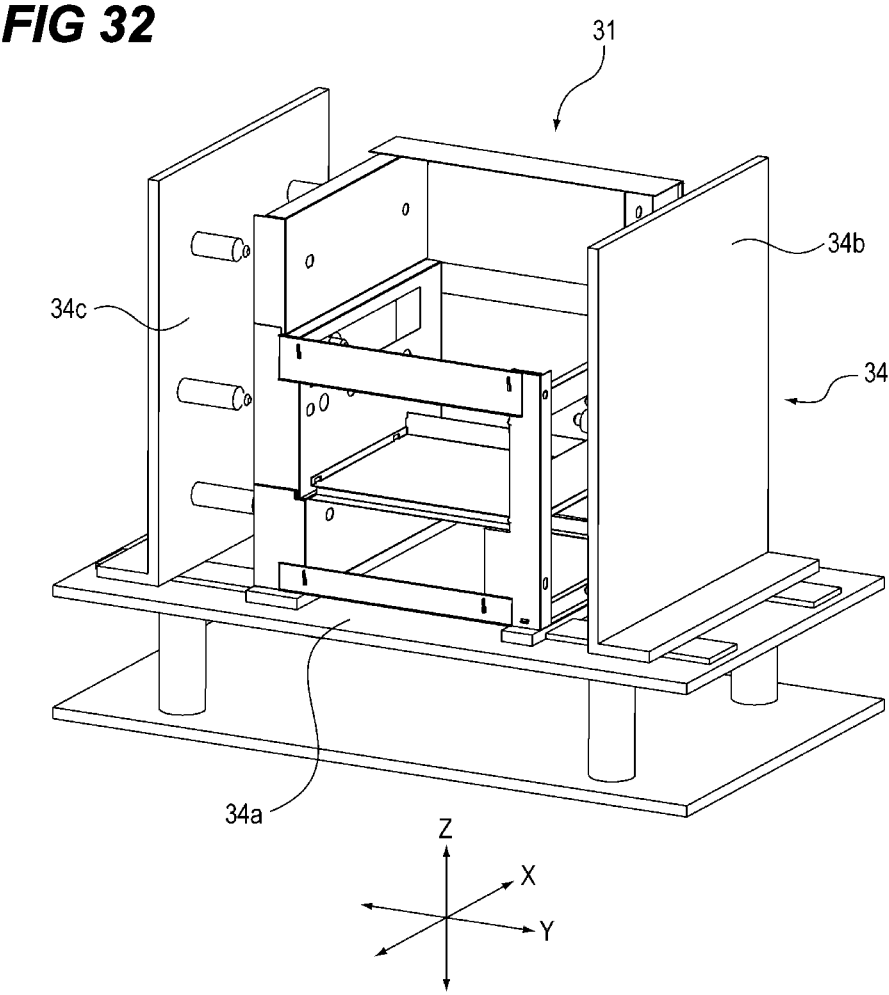
FIG. 32 is a perspective view of the frame and the jig.

FIG. 32 is a perspective view of the frame 31 assembled in the assembling process described above and the jig 34. As illustrated in FIGS. 30A and 30B, the frame 31 is detached from the stand 33 and placed on the base 34a of the jig 34 after the assembling process. At this time, the positioning pins 34a1 of the base 34a are inserted into the positioning holes 51a of the rear bottom plate 51 of the frame 31 or the positioning holes 57b of the front lower stay 57, such that a position of the frame 31 with respect to the base 34a is determined.

Figure 33:
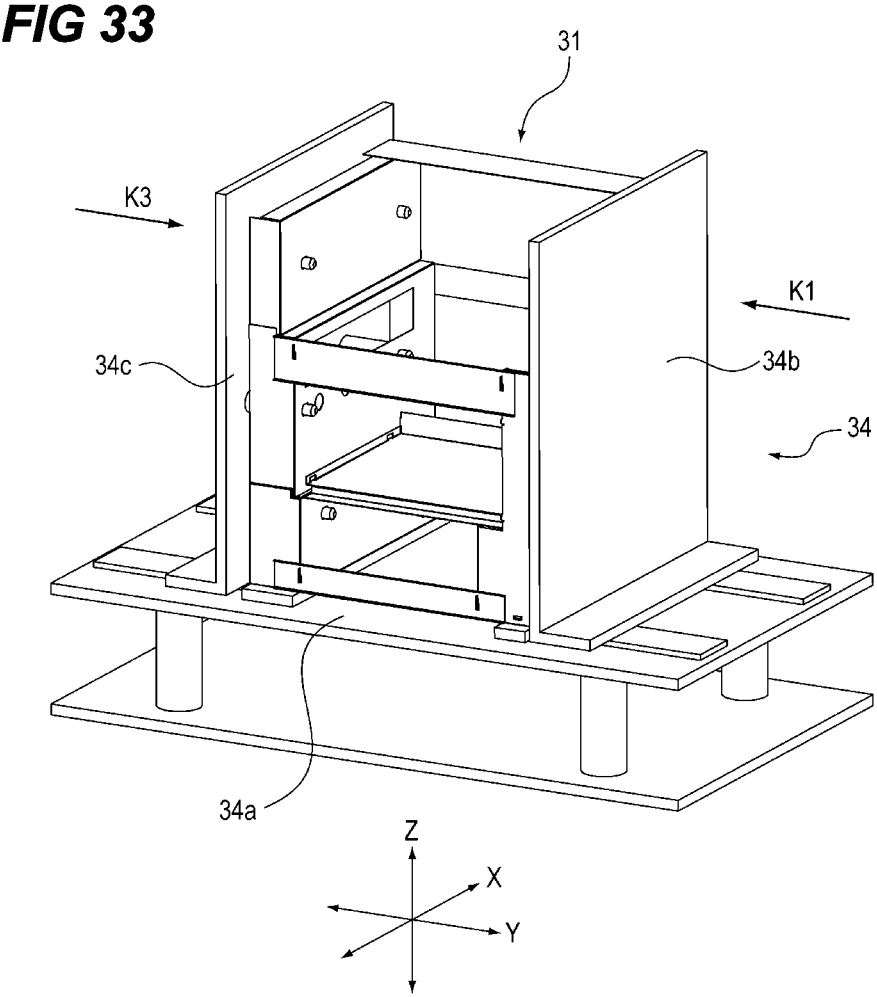
FIG. 33 is a perspective view of the frame and the jig.

As illustrated in FIG. 33, when joining the frame 31, an operator who performs a joining process slides the front side support portion 34b in the arrow K1 direction and slides the rear side support portion 34c in the arrow K3 direction. In addition, the frame 31 is pressed from a direction orthogonal to slide directions of the front side support portion 34b and the rear side support portion 34c and the vertical direction by a pressing device (not illustrated). As a result, the metal plates constituting the frame 31 are pressed against each other, such that unnecessary gaps between the metal plates are eliminated, and positioning is completed.

Then, the respective metal plates constituting the frame 31 are joined to each other by fiber laser welding by the operator. When the joining of the frame 31 is completed, the operator slides the front side support portions 34b in the arrow K2 direction, slides the rear side support portions 34c in the arrow K4 direction, and detaches the frame 31 from the jig 34. As a result, the frame 31 is completed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-154963, filed Sep. 15, 2020, which is hereby incorporated by reference herein in its entirety.

What is claimed is:

1. A metal frame of an image forming apparatus, comprising:
a first support member configured to support one end of an image forming unit that forms an image on a sheet, the first support member including a first metal plate and a second metal plate which supports the first metal plate below the first metal plate in a vertical direction;
a second support member which is spaced apart from the first support member and configured to support the other end of the image forming unit; and
a third support member configured to connect the first support member and the second support member to each other,
wherein the first metal plate includes
a first portion, and
a second portion which is bent from the first portion to form a right-angled corner in the first metal plate,
wherein the second metal plate includes:
a third portion,
a fourth portion which is bent substantially vertically upward in the vertical direction from an end portion in a first direction orthogonal to the vertical direction in the third portion, and the fourth portion being attached to the first portion of the first metal plate,
a fifth portion which is bent substantially vertically upward in the vertical direction from an end portion in a second direction orthogonal to the vertical direction and the first direction in the third portion, and the fifth portion being attached to the second portion of the first metal plate, and
a bent portion which is bent from an end portion in longitudinal direction of the fifth portion to a side opposite the second portion in the second direction, wherein the longitudinal of the fifth portion is perpendicular to the vertical direction.

2. The metal frame of an image forming apparatus according to claim 1, wherein
the first portion includes a first engaging portion which engages with the fourth portion, the first engaging portion includes a first bent portion which is bent in a plate thickness direction of the first portion and a second bent portion which is bent to extend in the vertical direction from the first bent portion toward the fourth portion, the first engaging portion engaging with the fourth portion such that the first portion and the second bent portion sandwich the fourth portion, and
the second portion includes a second engaging portion which engages with the fifth portion, and includes a third bent portion which is bent in a plate thickness direction of the second portion and a fourth bent portion which is bent to extend in the vertical direction from the third bent portion toward the fifth portion, the second engaging portion engaging with the fifth portion such that the second portion and the fourth bent portion sandwich the fifth portion.

3. The metal frame of an image forming apparatus according to claim 1, wherein
a gap between a tip of the bent portion of the fifth portion and the fourth portion is equal to or less than a plate thickness of the first metal plate.

4. The metal frame of an image forming apparatus according to claim 1, wherein
the first support member includes a first side plate which supports the image forming unit, a second side plate configured to support the first side plate below the first side plate, and a bottom plate configured to support the second side plate below the second side plate,
the second support member includes a third side plate which supports the image forming unit with the first side plate, a first support column configured to support one end side in a direction orthogonal to a vertical direction and a plate thickness direction of the third side plate in the third side plate, and a second support column configured to support the other end side in the direction orthogonal to the vertical direction and the plate thickness direction of the third side plate in the third side plate, and
the first metal plate is the second side plate, and the second metal plate is the bottom plate.

5. An image forming apparatus, comprising:
an image forming unit which forms an image on a sheet;
the metal frame of the image forming apparatus according to claim 1, the metal frame supporting the image forming unit; and
an outer cover configured to cover the metal frame.

6. The metal frame of an image forming apparatus according to claim 1, further comprising
a second bent portion which is bent from an end portion in longitudinal direction of the fourth portion to a side opposite the first portion in the first direction,
wherein the longitudinal direction of the fourth portion is perpendicular to the vertical direction.

7. The metal frame of an image forming apparatus according to claim 6, wherein
a gap between a tip of the second bent portion of the fourth portion and a tip of the bent portion of the fifth portion is equal to or less than a plate thickness of the first metal plate.

8. A metal frame of an image forming apparatus, comprising:
a first support member configured to support one end of an image forming unit that forms an image on a sheet, the first support member including a first metal plate and a second metal plate configured to support the first metal plate below the first metal plate in a vertical direction;

a second support member which is spaced apart from the first support member and configured to support the other end of the image forming unit; and a third support member configured to connect the first support and the member second support member to each other, wherein the first metal plate includes:

a first portion, and a second portion which is bent from the first portion to form a right-angled corner in the first metal plate, wherein the second metal plate includes a third portion, a fourth portion which is bent from the third portion to form a right-angled corner in the second metal plate, a fifth portion which is bent from an upper portion of the third portion to form a step with the third portion in a plate thickness direction of the third portion, the fifth portion being attached to the first portion of the first metal plate, a sixth portion which is bent from an upper portion of the fourth portion to form a step with the fourth portion in a plate thickness direction of the fourth portion, the sixth portion being attached to the second portion of the first metal plate, and a bent portion which is bent from an end portion in longitudinal direction of the sixth portion to a side opposite the second in the plate thickness direction of the fourth portion, wherein the longitudinal direction of the sixth portion is perpendicular to the vertical direction.

9. The metal frame of an image forming apparatus according to claim 8, wherein the first portion includes a first engaging portion which engages with the fifth portion, the first engaging portion including a first bent portion which is bent in a plate thickness direction of the first portion and a second bent portion which is bent to extend in the vertical direction from the first bent portion toward the fifth portion, the first engaging portion engaging with the fifth portion such that the first portion and the second bent portion sandwich the fifth portion, and the second portion includes a second engaging portion which engages with the sixth portion, the second engaging portion including a third bent portion which is bent in a plate thickness direction of the second portion and a fourth bent portion which is bent to extend in the vertical direction from the third bent portion toward the fifth portion, the second engaging portion engaging with the sixth portion such that the second portion and the fourth bent portion sandwich the sixth portion.

10. The metal frame of an image forming apparatus according to claim 8, wherein a gap between a tip of the bent portion of the sixth portion and the fifth portion is equal to or less than a plate thickness of the first metal plate.

11. The metal frame of an image forming apparatus according to claim 8, wherein the first metal plate supports the image forming unit, and the second support member includes a side plate which supports the image forming unit together with the first metal plate, a first support column configured to support one end side in a direction orthogonal to a vertical direction and a plate thickness direction of the side plate in the side plate, and a second support column configured to support the other end side in the direction orthogonal to the vertical direction and the plate thickness direction of the side plate in the side plate.

12. An image forming apparatus, comprising:

an image forming unit configured to form an image on a sheet;

the metal frame of the image forming apparatus according to claim 8, the metal frame supporting the image forming unit; and an outer cover configured to cover the metal frame.

13. The metal frame of an image forming apparatus according to claim 6, further comprising second bent portion which is bent from an end portion in longitudinal direction of the fifth portion to a side opposite the first portion in the plate thickness direction of the third portion, wherein the longitudinal direction of the fifth portion is perpendicular to the vertical direction.

14. The metal frame of an image forming apparatus according to claim 13, wherein a gap between a tip of the second bent portion of the fifth portion and a tip of the bent portion of the sixth portion is equal to or less than a plate thickness of the first metal plate.

* * * * *